US009452697B2

(12) United States Patent
Okubo et al.

(10) Patent No.: US 9,452,697 B2
(45) Date of Patent: Sep. 27, 2016

(54) SEAT DEVICE FOR VEHICLE

(71) Applicant: TS TECH CO., LTD., Asaka-Shi, Saitama (JP)

(72) Inventors: Takuya Okubo, Tochigi (JP); Isao Kawashima, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 14/416,327

(22) PCT Filed: Jun. 21, 2013

(86) PCT No.: PCT/JP2013/067104
§ 371 (c)(1),
(2) Date: Jan. 22, 2015

(87) PCT Pub. No.: WO2014/017232
PCT Pub. Date: Jan. 30, 2014

(65) Prior Publication Data
US 2015/0183343 A1    Jul. 2, 2015

(30) Foreign Application Priority Data

Jul. 24, 2012   (JP) ................................ 2012-164203
Apr. 25, 2013   (JP) ................................ 2013-092946

(51) Int. Cl.
*A47C 1/10* (2006.01)
*B60N 2/44* (2006.01)
(Continued)

(52) U.S. Cl.
CPC . *B60N 2/44* (2013.01); *B60N 2/48* (2013.01); *B60N 2/68* (2013.01); *F16F 7/108* (2013.01); *B60N 2002/4888* (2013.01)

(58) Field of Classification Search
CPC .... B60N 2/48; B60N 2/4885; B60N 2/4428; B60N 2/4808; B60N 2205/20
USPC .......................... 297/404, 410, 391; 267/136
See application file for complete search history.

(56) References Cited

U.S. PATENT DOCUMENTS 6,068,337 A * 5/2000 De Filippo .......... B60N 2/4814
297/391
7,140,687 B2 * 11/2006 Hoekstra .............. B60N 2/4832
297/378.12
(Continued)

FOREIGN PATENT DOCUMENTS

JP   H04-46246 U   4/1992
JP   2001161489 A   6/2001
(Continued)

OTHER PUBLICATIONS

Official Communication dated Jan. 6, 2016 corresponding to Chinese Patent Application 201380039234.0.
(Continued)

*Primary Examiner* — Jose V Chen
(74) *Attorney, Agent, or Firm* — Carrier Blackman & Associates, P.C.; William D. Blackman; Jingll Wang

(57) ABSTRACT

A seat device for a vehicle is provided in which a dynamic damper is formed of a weight and an elastic member supporting the weight so as to be capable of vibrating, and the elastic member is retained on a frame or a cushion member of a seat installed in the vehicle, wherein the weight is formed into a polyhedron whereas the elastic member is formed into a sheet shape, and the weight is covered and supported by the sheet-shaped elastic member. This enables the weight to be supported simply by the elastic member, and the dynamic damper to be provided at low cost.

31 Claims, 19 Drawing Sheets

(51) Int. Cl.
*B60N 2/48* (2006.01)
*F16F 7/108* (2006.01)
*B60N 2/68* (2006.01)

(56) References Cited

U.S. PATENT DOCUMENTS

| | | | | |
|---|---|---|---|---|
| 8,308,236 | B2* | 11/2012 | Ishimoto | B60N 2/4228 |
| | | | | 297/216.12 |
| 8,491,052 | B2* | 7/2013 | Werner | B60N 2/4885 |
| | | | | 297/216.12 |
| 8,833,859 | B2* | 9/2014 | Matsushima | B60N 2/4817 |
| | | | | 297/391 |
| 8,864,235 | B2* | 10/2014 | Menges | A47C 7/38 |
| | | | | 297/391 |
| 2008/0211151 | A1 | 9/2008 | Wieser et al. | |
| 2010/0060067 | A1* | 3/2010 | Robert | B60N 2/4814 |
| | | | | 297/404 |
| 2012/0098316 | A1 | 4/2012 | Matsushima et al. | |
| 2015/0159721 | A1* | 6/2015 | Okubo | B60N 2/48 |
| | | | | 297/404 |
| 2015/0198216 | A1* | 7/2015 | Koyama | H02K 41/035 |
| | | | | 267/140.14 |
| 2015/0246628 | A1* | 9/2015 | Ishimoto | B60N 2/48 |
| | | | | 297/410 |

FOREIGN PATENT DOCUMENTS

| | | |
|---|---|---|
| JP | 2002-242986 A | 8/2002 |
| JP | 2006034326 A | 2/2006 |
| JP | 2008-013010 A | 1/2008 |
| JP | 2008014377 A | 1/2008 |
| JP | 2008-296732 A | 12/2008 |
| JP | 2010-095054 A | 4/2010 |

OTHER PUBLICATIONS

Official Communication dated Mar. 2, 2016 to corresponding European Application No. 13822523.

* cited by examiner

FIG.19
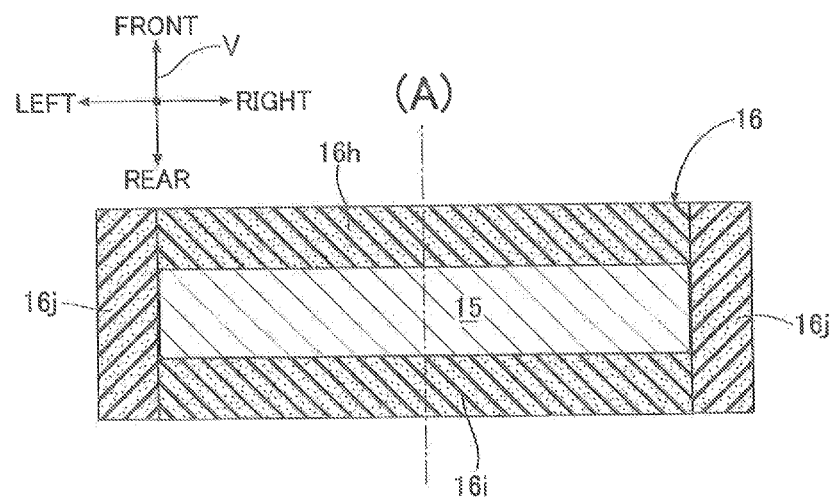
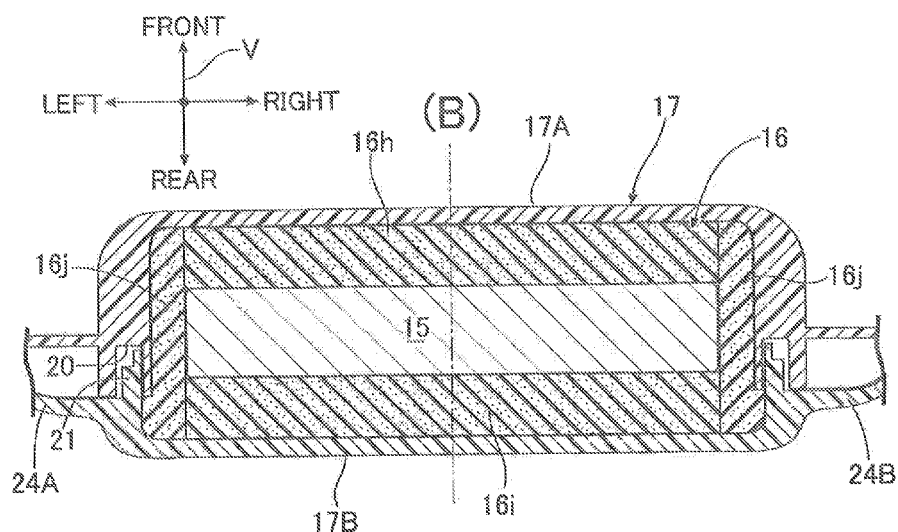

SEAT DEVICE FOR VEHICLE

TECHNICAL FIELD

The present invention relates to an improvement of a seat device for a vehicle in which a dynamic damper is formed from a weight and an elastic member that supports the weight so as to be capable of vibrating, and the elastic member is retained on a frame or a cushion member of a seat installed in the vehicle.

BACKGROUND ART

Such a seat device for a vehicle is known, as disclosed in Patent Document 1.

RELATED ART DOCUMENTS

Patent Documents

Patent Document 1: Japanese Patent Application Laid-open No. 2002-242986

SUMMARY OF THE INVENTION

Problems to be Solved by the Invention

In the seat device for a vehicle disclosed in Patent Document 1 above, an elastic member is molded integrally with the outer periphery of a weight. However, when molding the elastic member, it is necessary to employ positioning means for holding the weight at a predetermined position in a mold cavity; a molding device for the elastic member becomes complicated, it becomes difficult to reduce the molding cost for the elastic member and, moreover, when the positioning precision for the weight is low, since the thickness of the elastic member is not uniform, the spring constant of the elastic member changes, and the damping performance of the dynamic damper does not become stable. Moreover, after molding the elastic member, it is impossible from its appearance to confirm whether or not the weight is held at the predetermined position in the elastic member.

The present invention has been accomplished in light of such circumstances, and it is an object thereof to provide a seat device for a vehicle that enables a weight to be supported simply by an elastic member, and a dynamic damper to be provided at low cost.

Means for Solving the Problems

In order to attain the above object, according to a first aspect of the present invention, there is provided a seat device for a vehicle in which a dynamic damper comprises a weight and an elastic member supporting the weight so as to be capable of vibrating, and the elastic member is retained on a frame or a cushion member of a seat installed in the vehicle, characterized in that the weight is formed into a polyhedron whereas the elastic member is formed into a sheet shape, and the weight is covered and supported by the sheet-shaped elastic member.

Further, according to a second aspect of the present invention, in addition to the first aspect, the sheet-shaped elastic member is formed so as to be wrapped around the weight and opposite end parts of the sheet-shaped elastic member oppose each other without being superimposed on one another.

Furthermore, according to a third aspect of the present invention, in addition to the second aspect, opposite end parts of the sheet-shaped elastic member oppose each other on a face of the weight.

Moreover, according to a fourth aspect of the present invention, in addition to the third aspect, roundness is imparted to a ridge part of the weight that is in contact with the sheet-shaped elastic member.

Further, according to a fifth aspect of the present invention, in addition to the third aspect, opposite end parts of the sheet-shaped elastic member oppose each other on the face of the weight on the side opposite to a seated person.

Furthermore, according to a sixth aspect of the present invention, in addition to any one of the first to fifth aspects, opposite end parts of the sheet-shaped elastic member are adhered to the weight.

Moreover, according to a seventh aspect of the present invention, in addition to any one of the first to sixth aspects, the weight and the sheet-shaped elastic member covering the weight are housed within a damper case supported on the frame or the cushion member of the seat.

Further, according to an eighth aspect of the present invention, in addition to the seventh aspect, the weight and the sheet-shaped elastic member covering the weight are housed within the damper case supported on the cushion member of the seat, and the sheet-shaped elastic member is a material that is softer than the cushion member.

Furthermore, according to a ninth aspect of the present invention, in addition to the first aspect, in order to adjust the spring constant of the sheet-shaped elastic member, the sheet-shaped elastic member is provided with a non-covering region in which the sheet-shaped elastic member does not cover the weight.

Moreover, according to a tenth aspect of the present invention, in addition to the ninth aspect, the sheet-shaped elastic member is formed from a first elastic portion that covers one end part of the weight and a second elastic portion that covers the other end part of the weight, and the non-covering region is provided between the first and second elastic portions.

Further, according to an eleventh aspect of the present invention, in addition the ninth or tenth aspect, the weight is formed into a polygon, a damper chamber is formed into a similar polygon to the weight, and a peripheral edge part at one end and a peripheral edge part at the other end of the weight are covered by the sheet-shaped elastic member.

Furthermore, according to a twelfth aspect of the present invention, in addition to any one of the ninth to eleventh aspects, the sheet-shaped elastic member is disposed as a layer along an outer face of the weight.

Moreover, according to a thirteenth aspect of the present invention, in addition to the tenth aspect, the first and second elastic portions are formed into a cap shape that is fitted onto one end part and the other end part respectively of the weight.

Further, according to a fourteenth aspect of the present invention, in addition to the tenth or thirteenth aspect, the first and second elastic portions are formed so as to have the same shape interchangeable with each other.

Furthermore, according to a fifteenth aspect of the present invention, in addition to any one of the first to seventh aspects, the weight is formed into a hexahedron whereas the sheet-shaped elastic member is formed from a rectangular central portion corresponding to a first face, of the weight and four sheet pieces protruding from the periphery of the central portion, the central portion is superimposed on the first face of the weight, and the four sheet pieces are each folded inwardly so that end parts of the four sheet pieces oppose each other on a second face on the side opposite to the first face of the weight. Here, the first face and the second face of the weight correspond to a front face 15*f* and a rear face 15*r* respectively of a weight 15 in embodiments, which are described later.

Effects of the Invention

In accordance with the first aspect of the present invention, since the weight is formed into a polyhedron whereas the elastic member is formed into a sheet shape, and the weight is supported by covering it with the sheet-shaped elastic member, it is possible, by molding in advance the sheet-shaped elastic member so as to have a desired thickness and covering the weight therewith, to very easily form the elastic member having a desired thickness on the outer peripheral face of the weight, thereby enabling a dynamic damper having stable damping characteristics to be provided at low cost.

In accordance with the second aspect of the present invention, since the sheet-shaped elastic member is formed so that, when wrapping the weight therewith, opposite end parts oppose each other without being superimposed on one another, it is possible to prevent the thickness from increasing due to overlapping of the sheet-shaped elastic member, thereby enabling the spring constant of the sheet-shaped elastic member to be stabilized, and consequently the damping characteristics of the dynamic damper to be stabilized.

In accordance with the third aspect of the present invention, since the opposite end parts of the sheet-shaped elastic member oppose each other on a face of the weight, it is possible to reliably cover even a ridge part of the polyhedron weight with the sheet-shaped elastic member, thereby enabling the damping characteristics of the dynamic damper to be further stabilized.

In accordance with the fourth aspect of the present invention, since the ridge part of the weight, which is in contact with the sheet-shaped elastic member, is rounded, it is possible to prevent the sheet-shaped elastic member from being damaged by the ridge part of the weight, thus enhancing the durability of the sheet-shaped elastic member.

In accordance with the fifth aspect of the present invention, since opposite end parts of the sheet-shaped elastic member oppose each other on the face of the weight on the side that is opposite to a seated person, even if an abnormal noise is generated by friction between the opposing end parts of the sheet-shaped elastic member when the weight vibrates, the abnormal noise will not easily reach the seated person, thus enabling the seated person to experience good ride comfort.

In accordance with the sixth aspect of the present invention, since opposite end parts of the sheet-shaped elastic member are adhered to the weight, fixing of the sheet-shaped elastic member covering the weight can be carried out simply merely by adhering the opposite end parts of the sheet-shaped elastic member to the weight, and an operation of mounting the sheet-shaped elastic member can be carried out easily.

In accordance with the seventh aspect of the present invention, since the weight and the sheet-shaped elastic member covering same are housed within the damper case supported on the frame or the cushion member of the seat, it is possible by means of the damper case to prevent foreign matter such as the cushion member from entering into the area around the sheet-shaped elastic member, thus ensuring an appropriate damping function for the dynamic damper.

In accordance with the eighth aspect of the present invention, since the weight and the sheet-shaped elastic member covering same are housed within the damper case supported on the cushion member of the seat, and this sheet-shaped elastic member is softer than the cushion member, it is possible for the dynamic damper to exhibit a damping function without interference from the elasticity of the cushion member of the seat.

In accordance with the ninth aspect of the present invention, since in order to adjust the spring constant of the sheet-shaped elastic member, the sheet-shaped elastic member is provided with the non-covering region that does not cover the weight, it is possible, by increasing or decreasing the area of the non-covering region, to easily adjust the spring constant of the sheet-shaped elastic member, thus enabling adjustment and alteration of the damping characteristics of the dynamic damper D to be easily carried out at low cost.

In accordance with the tenth aspect of the present invention, since the sheet-shaped elastic member is formed from the first elastic portion covering one end part of the weight and the second elastic portion covering the other end part of the weight, and the non-covering region is provided between the first and second elastic portions, it is possible, by increasing or decreasing the width of the non-covering region, to more easily adjust the spring constant of the sheet-shaped elastic member.

In accordance with the eleventh aspect of the present invention, since the weight is formed into a polygon, the damper chamber is formed into a similar polygon to that of the weight, and the peripheral edge at one end and the peripheral edge at the other end of the weight are covered by the sheet-shaped elastic member, it is possible to avoid effectively contact of the weight with the inner face of the damper chamber with the minimum necessary amount of damping of the sheet-shaped elastic member, thereby enabling the occurrence of an abnormal noise due to the contact to be reliably prevented.

In accordance with the twelfth aspect of the present invention, since the sheet-shaped elastic member is disposed as a layer along the outer face of the weight, the space occupied by the sheet-shaped elastic member in the damper chamber can be made sufficiently narrow, thus enabling the support to be made compact.

In accordance with the thirteenth aspect of the present invention, since the first and second elastic portions are formed into a cap shape fitted onto one end part and the other end part of the weight, merely fitting the cap-shaped first and second elastic portions onto one end part and the other end part of the weight enables them to be mounted on the weight without adhesion.

In accordance with the fourteenth aspect of the present invention, since the first and second elastic portions are formed so as to have the same shape so that they are interchangeable with each other, either of the first and second elastic portions may be assembled on either of one end part and the other end part of the weight, thereby enabling erroneous assembly to be prevented.

In accordance with the fifteenth aspect of the present invention, since the weight is formed into a hexahedron whereas the elastic member is formed from a rectangular central portion corresponding to the first face of the weight and the four sheet pieces protruding from the periphery of the central portion, the first face of the weight is superimposed on the central portion, and the four sheet pieces are each folded inwardly so that end parts of the four sheet pieces oppose each other on the second face on the side opposite to the first face of the weight, it is possible by means of the one simply shaped sheet-shaped elastic member to cover the six faces of the hexahedral weight without creasing the sheet-shaped elastic member, thus enabling the weight to be elastically supported in all directions with a stable spring constant and the dynamic damper to exhibit a good damping performance in all directions.

BRIEF DESCRIPTION OF DRAWINGS

FIG. 19 is a sectional view, corresponding to FIG. 17, showing an eleventh embodiment of the present invention; (A) shows the state of an elastic member before the weight is housed in a damper case, and (B) shows the state of the elastic member when the weight is housed in the damper case together with the elastic member (eleventh embodiment).

EXPLANATION OF REFERENCE NUMERALS AND SYMBOLS

Figure 1:
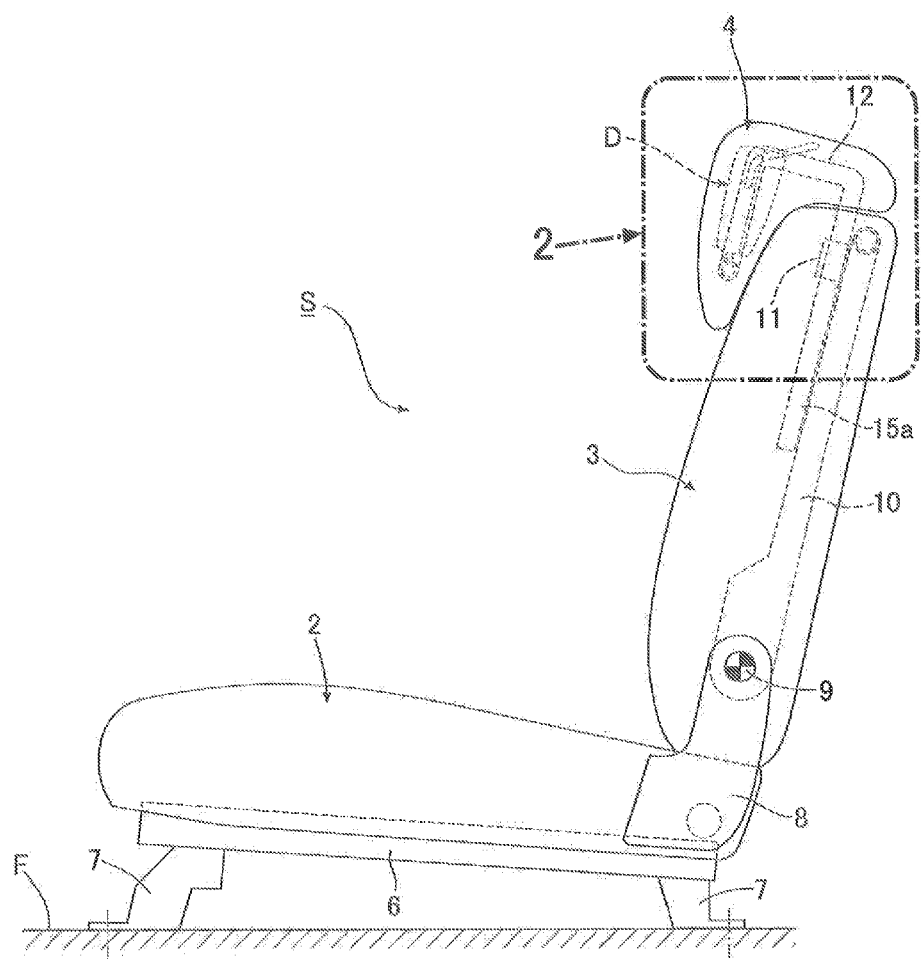
FIG. 1 is a side view of a seat device for an automobile related to a first embodiment of the present invention (first embodiment).

D Dynamic damper
S Seat
6 Seat frame (seat cushion frame)
10 Seat frame (seat back frame)
12 Seat frame (headrest frame)
13 Cushion member
15 Weight
15*f* Weight first face (front face)
15*r* Weight second face (rear face)
16 Sheet-shaped elastic member
17 Damper case

MODES FOR CARRYING OUT THE INVENTION

A first embodiment of the present invention shown in FIG. 1 to FIG. 8 is now explained. In the explanation below, fore-and-aft and left-and-right are with respect to an automobile as a vehicle to which the present invention is applied.
First Embodiment In FIG. 1, a seat S for an automobile is formed from a seat cushion 2, a seat back 3, and a headrest 4. The seat cushion 2 has a seat cushion frame 6 having formed in a lower part a plurality of support legs 7 and 7, and the support legs 7 and 7 are fixed to a floor F of the automobile.

A pair of left and right brackets 8, which project upwardly, are provided so as to be connected to a rear end part of the seat cushion frame 6, and a seat back frame 10 of the seat back 3 is linked to the brackets 8 via a pivot shaft 9 so that it can recline.

Furthermore, a pair of left and right support tubes 11 and 11 are fixedly provided on an upper end part of the seat back frame 10, and the headrest 4 is supported by these support tubes 11 and 11 so that it can be raised, lowered, and fixed.

As shown in FIG. 2 to FIG. 6, the headrest 4 is formed into a teardrop shape from a headrest frame 12, a urethane foam cushion member 13 supported thereon, and a surface skin 14 covering the surface thereof, and a dynamic damper D is mounted on the headrest frame 12.

The headrest frame 12 is formed by bending a pipe material, and is formed from a pair of left and right main frame members 12*a* and 12*a* supported on the pair of support tubes 11 and 11, upper frame members 12*b* and 12*b* bending forwardly from the upper ends of the main frame members 12*a* and 12*a*, a pair of left and right front vertical frame members 12*c* and 12*c* extending while bending downwardly from the front lower ends of the upper frame members 12*b* and 12*b*, and a front horizontal frame member 12*d* integrally linking lower end parts of the front vertical frame members 12*c* and 12*c* to each other; a reinforcing crossbar 19 having a smaller diameter than that of the pipe material is welded so as to bridge the left and right front vertical frame members 12*c* and 12*c*. The cushion member 13 is formed so as to cover the headrest frame 12 from upper parts of the main frame members 12*a* and 12*a* to the front horizontal frame member 12*d*, and the cushion member 13 is covered by the surface skin 14.

Before forming this cushion member 13, the dynamic damper D is mounted by utilizing the front vertical frame members 12*c* and 12*c* and the front horizontal frame member 12*d*. The dynamic damper D is formed from a weight 15, a sheet-shaped elastic member 16 covering the weight 15 so as to be superimposed on the entire face thereof, and a damper case 17 housing the weight 15 and the sheet-shaped elastic member 16, the damper case 17 elastically supporting the weight 15 via the sheet-shaped elastic member 16 in all directions. The sheet-shaped elastic member 16 is softer than the cushion member 13.

Figure 2:
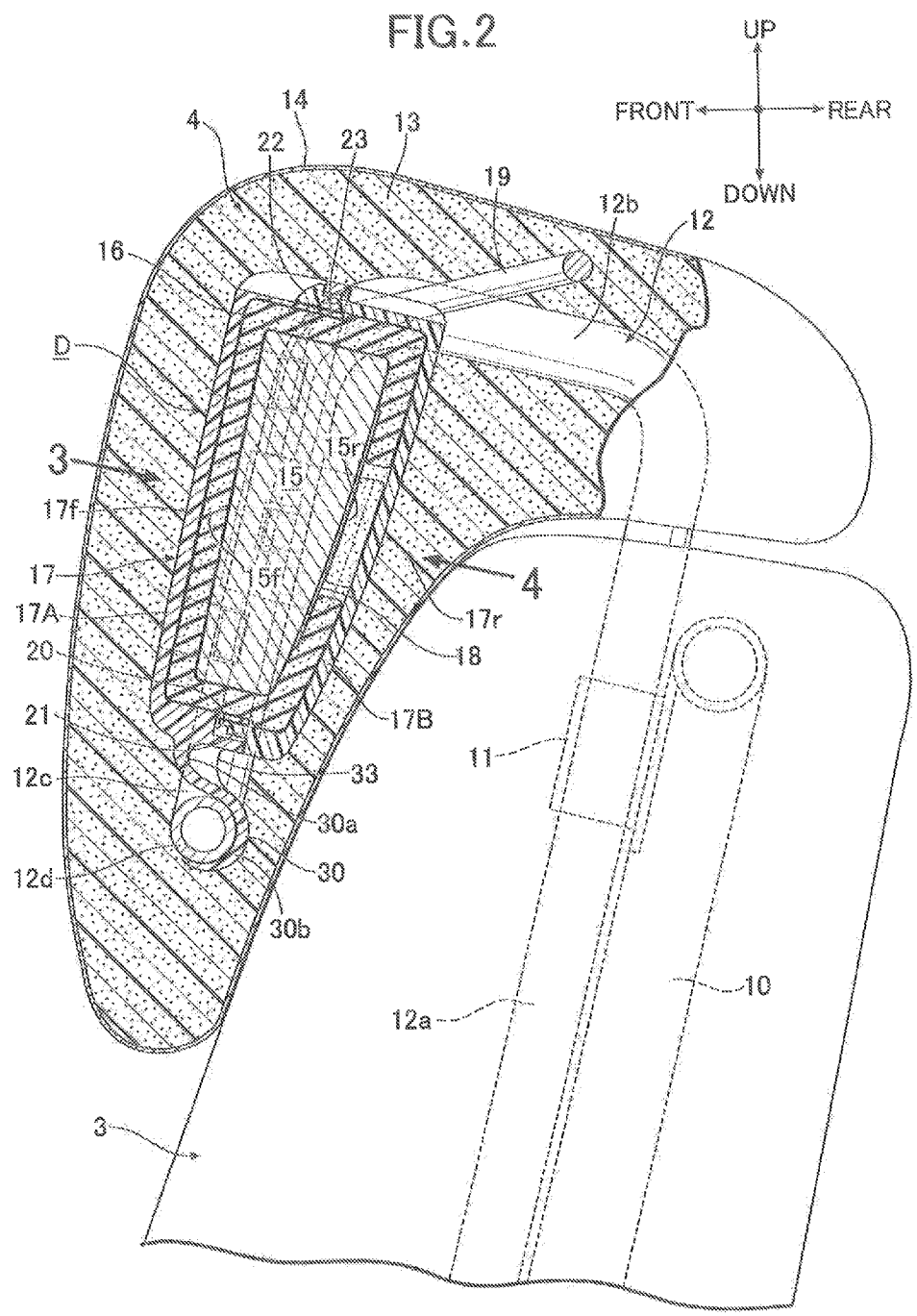
FIG. 2 is an enlarged view of part 2 in FIG. 1 (area around headrest) (first embodiment).
Figure 3:
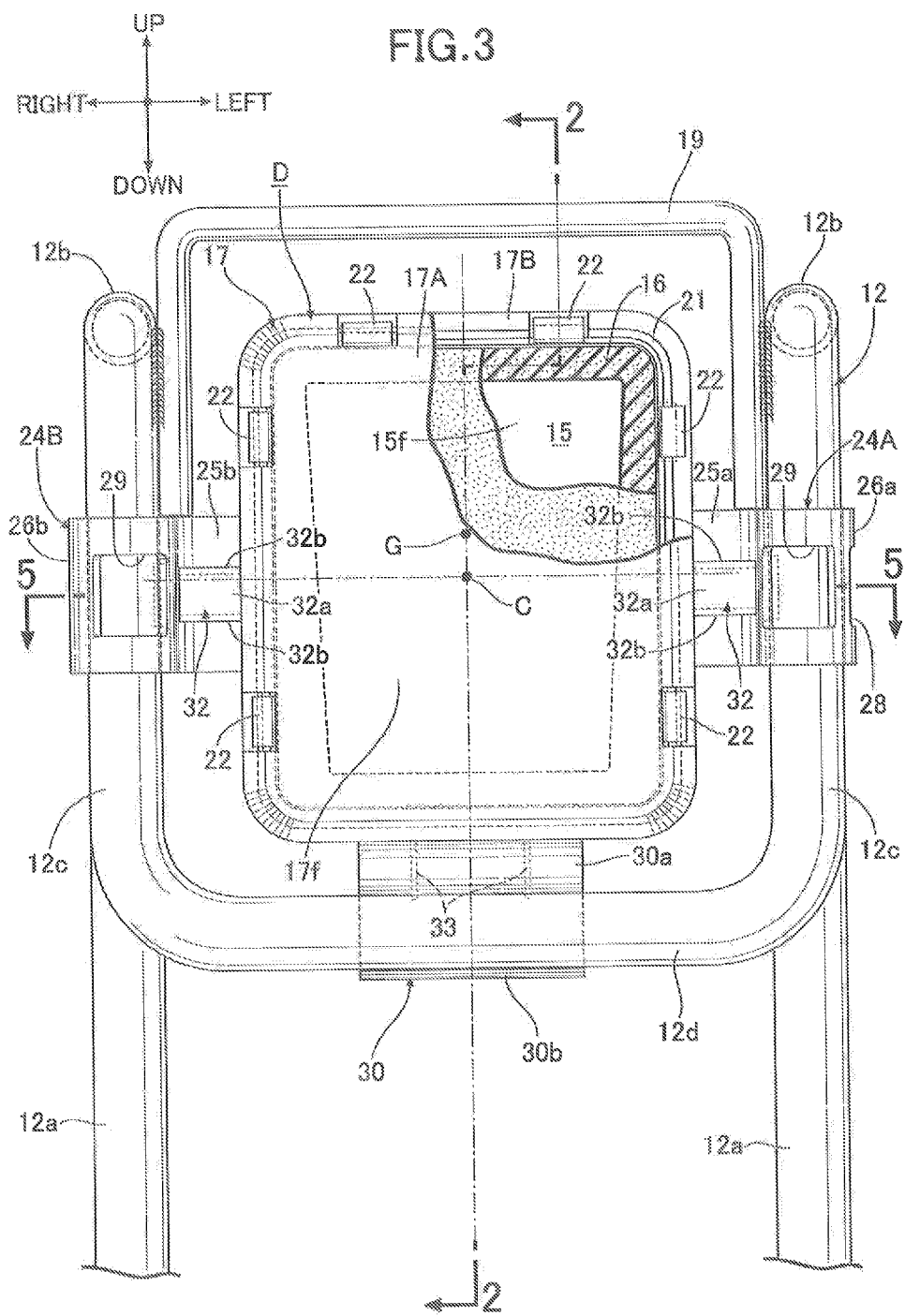
FIG. 3 is a view in the direction of arrow 3 in FIG. 2 (first embodiment).
Figure 4:
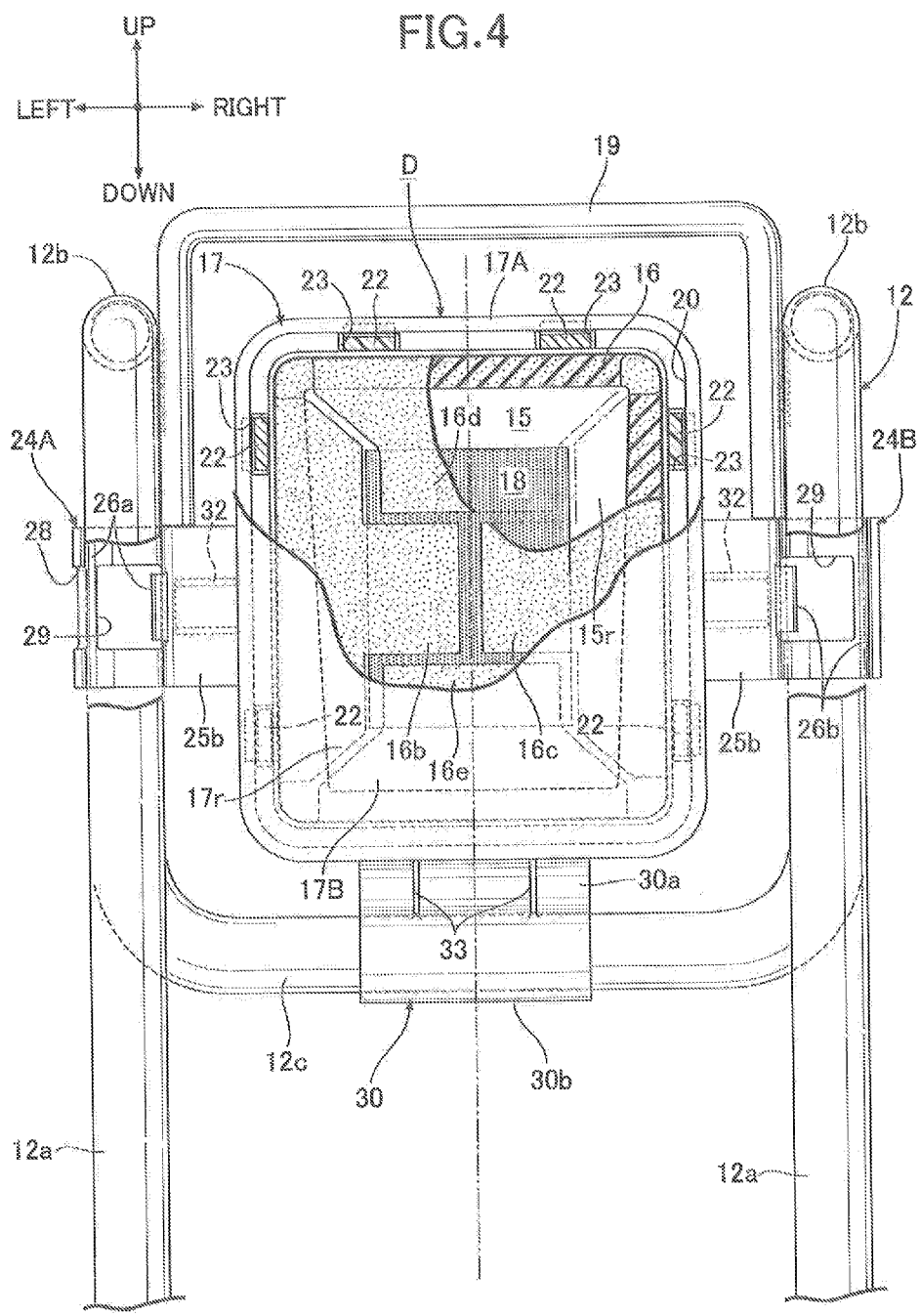
FIG. 4 is a view in the direction of arrow 4 in FIG. 2 (first embodiment).
Figure 5:
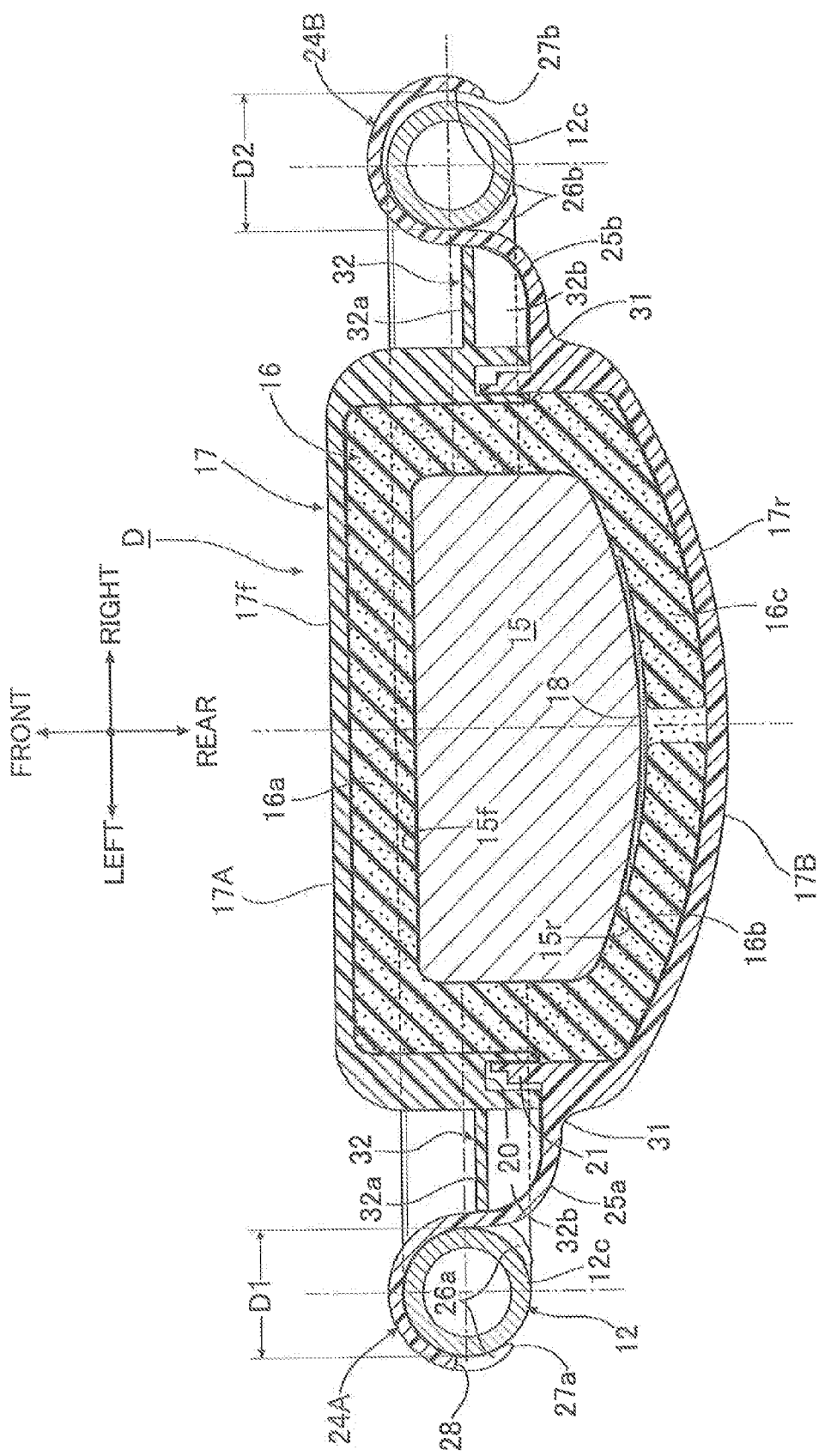
FIG. 5 is a sectional view along line 5-5 in FIG. 3 (first embodiment).
Figure 6:
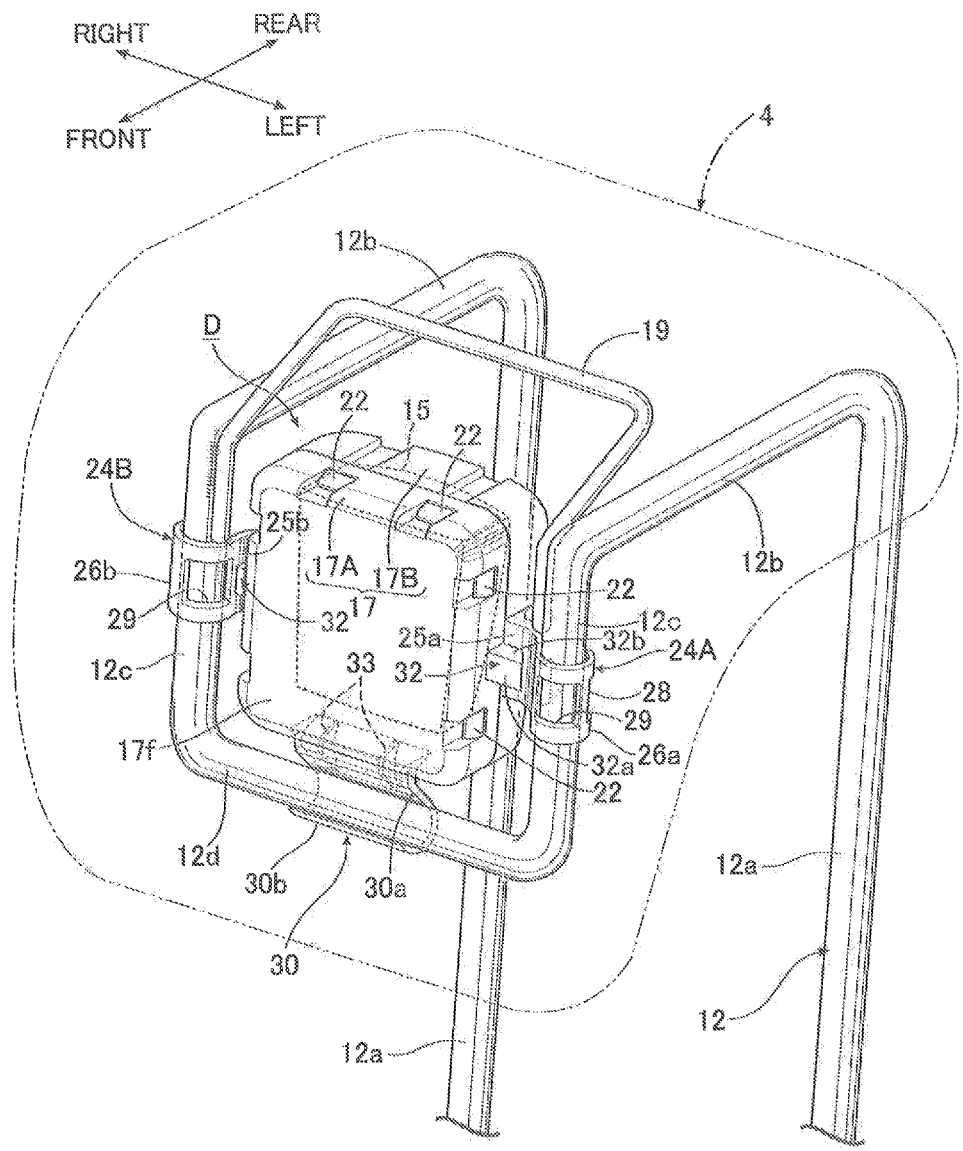
FIG. 6 is a perspective view corresponding to FIG. 3 (first embodiment).
Figure 7:
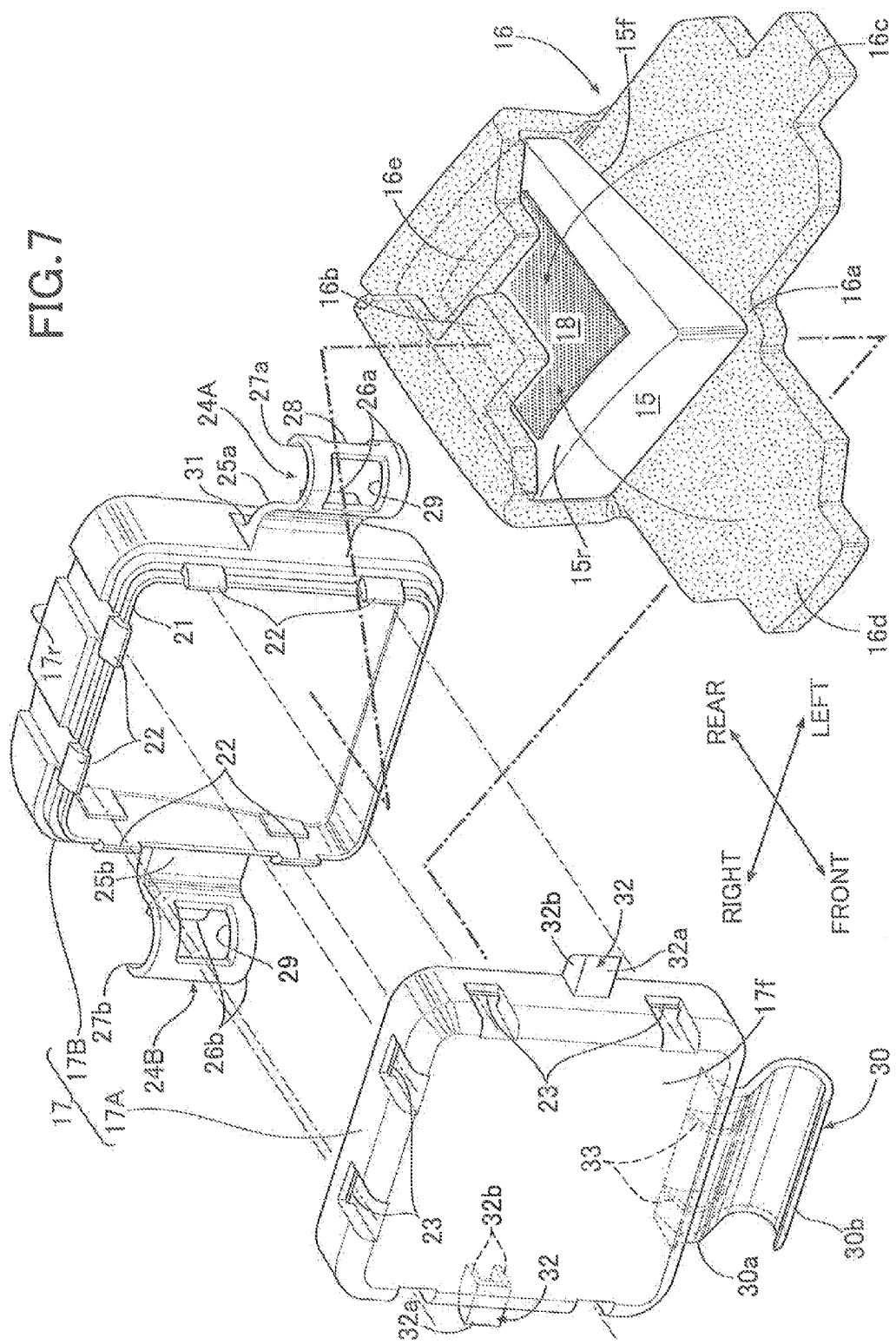
FIG. 7 is an exploded perspective view of a dynamic damper in FIG. 6 (first embodiment).

As is clearly shown in FIG. 2, FIG. 5, and FIG. 7, the weight 15 is made of cast iron and is a polyhedron that is flat in the fore-and-aft direction, a hexahedron in the illustrated example, its front face 15f is formed into a flat face or a protruding curved face that is close thereto, and its rear face 15r is formed into a curved face that protrudes and to a greater extent than the front face 15f. Furthermore, the weight 15 is formed so as to gradually increase in thickness in the fore-and-aft direction in going upward; this makes the center of gravity G of the weight 15 be positioned above the center C of the weight 15. Furthermore, each ridge part of the weight 15 of the hexahedron is rounded.

The sheet-shaped elastic member 16 is molded from a urethane foam so as to have a desired thickness and is formed by making four sheet pieces 16b to 16e protrude from a rectangular central portion 16a corresponding to the front face 15f of the weight; when covering the weight 15 with the sheet-shaped elastic member 16, after the rear face 15r of the weight 15 is placed on the central portion 16a of the sheet-shaped elastic member 16, the four sheet pieces 16b to 16e are each raised and folded toward the front face 15f side of the weight 15, and adhered to the rear face 15r via double-sided adhesive tape 18. In this way, extremity parts of the four sheet pieces 16b to 16e are disposed so as to oppose each other without overlapping one another on the rear face 15r of the weight 15.

The weight 15 thus covered by the sheet-shaped elastic member 16 is housed within the damper case 17, which can be divided into two in the fore-aft-aft direction. The weight 15 is thus supported on the damper case 17 via the sheet-shaped elastic member 16.

As shown in FIG. 2 to FIG. 7, the damper case 17 has a shape that is similar to the external shape of the weight 15; it therefore has a box shape that is flat in the fore-and-aft direction, its front wall 17f is formed as a flat face or a curved face that is close thereto so as to correspond to the front face 15f of the weight 15, and its rear wall 17r is formed into a curved face that projects rearwardly by a large amount so as to correspond to the rear face 15r of the weight 15.

This damper case 17 is divided into two, that is a first case half 17A on the front side and a second case half 17B on the rear side, each of the case halves 17A and 17B being molded using a synthetic resin. A rectangular mating groove 20 and a mating projecting wall 21 are provided on one and the other of opposing faces of the two case halves 17A and 17B, the mating groove 20 and the mating projecting wall 21 being capable of being fitted together, a plurality of linking claws 22 projecting outwardly are formed at the extremity of the mating projecting wall 21, and a plurality of linking holes 23 that the linking claws 22 can elastically snap fit into are formed in the bottom of the mating groove 20.

First and second elastic support parts 24A and 24B are formed integrally with left and right side walls of the second case half 17B. These first and second elastic support parts 24A and 24B are formed from plate-shaped arms 25a and 25b projecting outwardly from the left and right side walls of the second case half 17B and major arc-shaped gripping claws 26a and 26b connectedly provided at the extremity of the arms 25a and 25b and capable of snap fitting onto the front vertical frame members 12c and 12c so as to grip them. That is, the major arc-shaped gripping claws 26a and 26b can elastically grip the front vertical frame members 12c and 12c over more than half the periphery thereof. With regard to the major arc-shaped gripping claws 26a and 26b, opening portions 27a and 27b are directed rearwardly so as to engage with the front vertical frame members 12c and 12c from the front. Therefore, a rearward load from the head of an occupant acts in a direction in which the gripping claws 26a and 26b of the first and second elastic support parts 24A and 24B engage with the front vertical frame members 12c and 12c, thus preventing disengagement of the gripping claws 26a and 26b. Furthermore, it is possible, by selection of the length of the arms 25a and 25b, to make the distance between the centers of the gripping claws 26a and 26b coincide with the distance between the centers of the two front vertical frame members 12c and 12c, thereby enabling engagement of the gripping claws 26a and 26b with the front vertical frame members 12c and 12c to be appropriately carried out.

The major arc-shaped gripping claws 26a and 26b are formed so that their internal diameters D1 and D2 are different from each other. In the illustrated example, the internal diameter D2 of the gripping claw 26b of the second elastic support part 24B is set larger than the internal diameter D1 of the gripping claw 26a of the first elastic support part 24A. Furthermore, the major arc-shaped gripping claws 26a and 26b are formed so that their stiffnesses are different from each other. In the illustrated example, a cutout 28 is provided in an extremity part of the gripping claw 26a of the first elastic support part 24A so that the stiffness of the gripping claw 26a of the first elastic support part 24A is lower than that of the gripping claw 26b of the second elastic support part 24B, or the thickness of the gripping claw 26a is set to be thinner than that of the gripping claw 26b. Furthermore, the first and second elastic support parts 24A and 24B are disposed so as to sandwich the center of gravity G of the weight 15.

Moreover, each of the gripping claws 26a and 26b is provided with a window hole 29, and the state of engagement of the gripping claws 26a and 26b and the front vertical frame members 12c and 12c can be visually confirmed through the window hole 29.

On the other hand, a positioning support part 30 is formed integrally with a lower wall of the first case half 17A. This positioning support part 30 is formed from a plate-shaped arm 30a that projects downwardly from a lower wall of the first case half 17A and a U-shaped abutment claw 30b that is connectedly provided at the lower end of the arm 30a and abuts against and engages with the front horizontal frame member 12d; this abutment claw 30b abuts against and engages with the front horizontal frame member 12d from the rear so as to define the position at which the gripping claws 26a and 26b and the left and right front vertical frame members 12c and 12c are engaged. The mounting position for the damper case 17 on the headrest frame 12 is thus determined Formed on bases of the arms 25a and 25b of the first and second elastic support parts 24B and the positioning support part 30 is a thick part 31 for reinforcing the bases, and formed on the left and right side walls of the first case half 17A are a pair of stoppers 32 and 32 that abut against the arms 25a and 25b of the first and second elastic support parts 24A and 24B so as to restrict forward flexure thereof, that is, flexure of the arms 25a and 25b toward the side opposite to the opening portions 27a and 27b of the gripping claws 26a and 26b. Each stopper 32 is formed so as to have a squared U-shaped section from a middle wall portion 32a linearly abutting against a back face of the corresponding gripping claws 26a and 26b, and a pair of side wall portions 32b and 32b connected to opposite ends of the middle wall portion 32a and abutting against a curved face extending from the corresponding arms 25a and 25b to the back face of the gripping claws 26a and 26b. Since the stopper 32 thus arranged has high stiffness and can ensure that there is a wide abutment face against the back face of an area from the corresponding arms 25a and 25b to the gripping claws 26a and 26b, flexure of the arms 25a and 25b can be restricted effectively while avoiding the concentration of stress as much as possible. Therefore, even if a large rearward load acts on the damper case 17 from the head of an occupant, the stoppers 32 and 32 abut against the front faces of the arms 25a and 25b to thus restrict forward flexure of the arms 25a and 25b, thereby restricting unnecessary rearward movement of the damper case 17.

Since the stopper 32 is integrally linked to the outside wall of the mating groove 20, it can contribute to reinforcement of the outside wall of the mating groove 20.

Furthermore, formed on the arm portion 30a of the positioning support part 30 are a plurality of reinforcing ribs 33 linking the lower wall of the first case half 17A and the abutment claw 30b.

Figure 8:
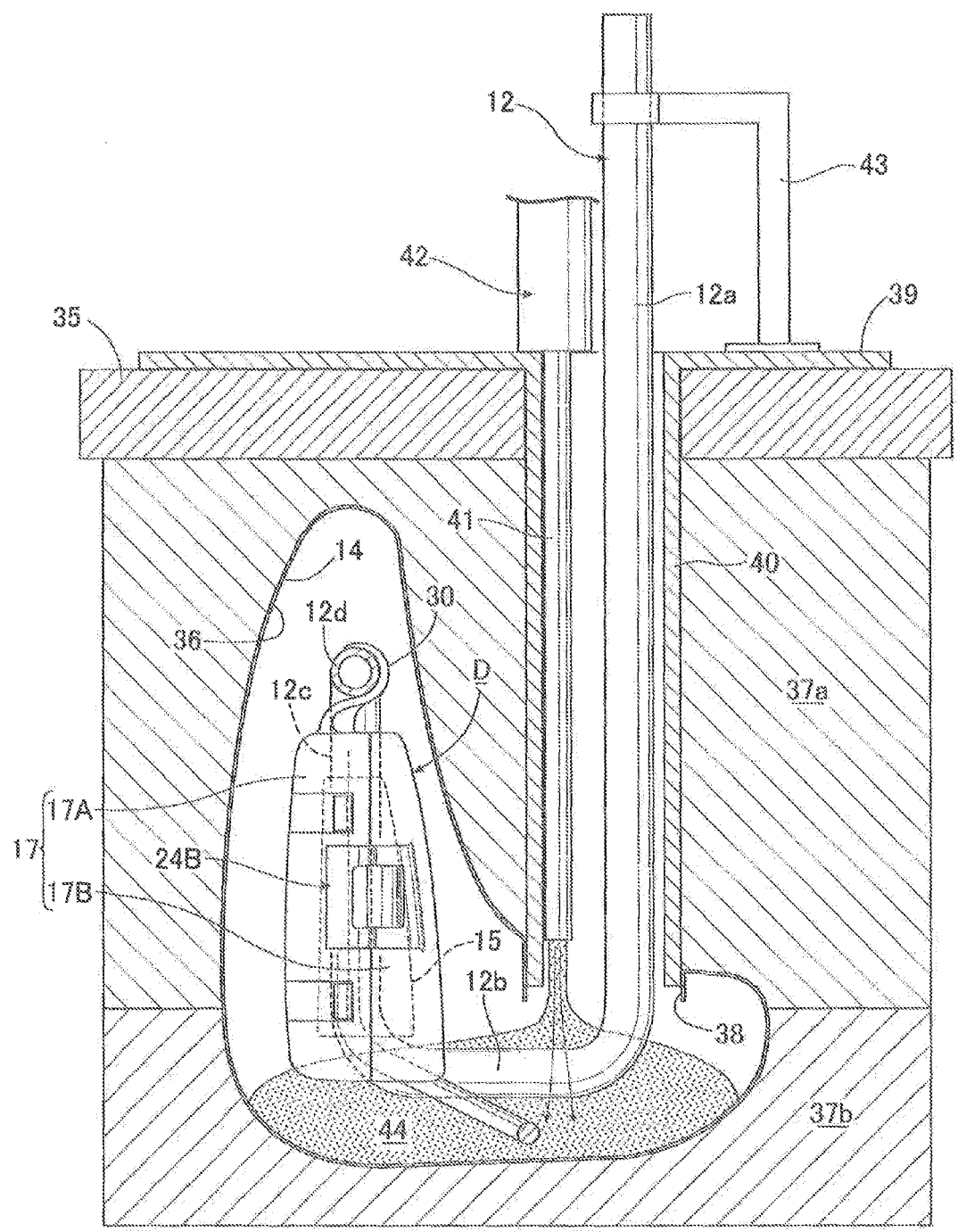
FIG. 8 is a diagram for explaining a method for molding a cushion member of a headrest using a foam material (first embodiment).

A method for embedding the dynamic damper D in the headrest 4 is now explained by reference to FIG. 8.

Molds 37a and 37b that can be opened and closed in the vertical direction are mounted on a lower face of a machine platform 35, the molds 37a and 37b forming a cavity 36 corresponding to the external shape of the headrest 4 apart from the headrest frame 12, and the surface skin 14 for the headrest 4 is stretched in advance on an inner face of the cavity 36.

The surface skin 14 is provided with a foaming synthetic resin pouring inlet 38 opening on an upper face thereof, and a support plate 39 fixed to an upper face of a molding stage 35 is provided with a nozzle guide tube 40 inserted into the foam material pouring inlet 38. Mounted on the support plate 39 is a foam material supply device 40 having a nozzle 41 inserted into the nozzle guide tube 40. The main frame members 12a and 12a of the headrest frame 12 disposed within the nozzle guide tube 40 are supported on a bracket 43 provided on the support plate 39. The dynamic damper D, which is supported on the front vertical frame members 12c and 12c of the headrest frame 12, is disposed offset toward one side of the foam material pouring inlet within the surface skin 14.

The foam material 44 such as a urethane is poured into the bag-shaped surface skin 14 in intimate contact with the inner face of the cavity 36 from the foam material supply device 40 through the nozzle 41, etc., and by making it foam the cushion member 13 covering the headrest frame 12 and the dynamic damper D can be formed within the surface skin 14. In this process, disposing the dynamic damper D, which is supported on the front vertical frame members 12c and 12c, offset toward one side of the foam material pouring inlet 38 enables the pouring pressure of the foam material 44 into the foam material pouring inlet 38 to be prevented from acting directly on the dynamic damper D, and there is therefore no possibility that the dynamic damper D will be disengaged from the front vertical frame members 12c and 12c of the elastic support parts 24A and 24B by means of the pouring pressure. Furthermore, since the first and second case halves 17A and 17B are joined by fitting together the mating groove 20 and the mating projecting wall 21 on the mutually opposing faces, it is possible to reliably prevent by virtue of a labyrinth effect the foam material 44 from entering via the joined faces of the two case halves 17A and 17B, thereby enabling the damping function of the dynamic damper D to be appropriately maintained.

The headrest 4 thus produced can be taken out of the molds 37a and 37b by opening them in the vertical direction.

The operation of this first embodiment is now explained.

When assembling the dynamic damper D, the weight 15 covered by the sheet-shaped elastic member 16 as described above is fitted into the first case half 17A or the second case half 17B of the damper case 17, then opening parts of the two case halves 17A and 17B are matched up, and the mating projecting wall 21 of one opening part is inserted deeply into the mating groove 20 of the other opening part, thereby enabling the two case halves 17A and 17B to be simply joined by means of engagement of the linking claws 22 and the latching holes 23 without using screws, etc., and at the same time the weight 15 can be supported in all directions on the damper case 17 via the sheet-shaped elastic member 16.

When mounting the dynamic damper D thus assembled onto the headrest frame 12, the gripping claws 26a and 26b of the first and second elastic support parts 24A and 24B are first pushed from the front against the left and right front vertical frame members 12c and 12c of the headrest frame 12, and the left and right gripping claws 26a and 26b are snap fitted onto the left and right front vertical frame members 12c and 12c to thus grip the front vertical frame members 12c and 12c. The damper case 17 can simply and easily be mounted on the headrest frame 12 without using screws and, moreover, because of the snap fitting of the gripping claws 26a and 26b there is no need to subject the left and right front vertical frame members 12c and 12c to special machining In this arrangement, since the internal diameter D2 of the gripping claw 26b of the second elastic support part 24B is set larger than the internal diameter D1 of the gripping claw 26a of the first elastic support part 24A, and the gripping claws 26a and 26b have different stiffnesses from each other, it is possible to absorb the manufacturing error resulting in a difference between the distance between the centers of the left and right front vertical frame members 12c and 12c and the distance between the centers of the left and right of the gripping claws 26a and 26b by relatively small elastic deformation of the left and right gripping claws 26a and 26b, and it is therefore possible to easily and reliably mount the two gripping claws 26a and 26b on the two front vertical frame members 12c and 12c in spite of the manufacturing error.

While the automobile is traveling, when there is transmission of vibration of the automobile from the floor F to the seat back 3 and the headrest 4 via the seat cushion 2 and the pivot shaft 9, in the dynamic damper D resonance of the weight 22 is accompanied by elastic deformation of the sheet-shaped elastic member 16, and vibrational energy of the seat back 3 and the headrest 4 is instead absorbed, thus damping the seat back 3 and the headrest 4. Furthermore, since the sheet-shaped elastic member 16 is softer than the cushion member 13 covering the dynamic damper D, the dynamic damper D can exhibit a damping function without interference from the elasticity of the cushion member 13.

In such a dynamic damper D, since the weight 15 is formed into a polyhedron, and this weight 15 is supported by covering it with the sheet-shaped elastic member 16 molded with a desired thickness in advance, it is possible to very easily form an elastic member having a desired thickness on the outer peripheral face of the weight 15, thereby enabling a dynamic damper D having stable damping characteristics to be provided at low cost.

In this arrangement, since the opposite end parts of the sheet-shaped elastic member 16 covering the weight 15 are disposed so as to oppose each other without being superimposed on one another, it is possible to prevent the thickness from increasing due to overlap of the sheet-shaped elastic member 16, thereby enabling stabilization of the spring constant of the sheet-shaped elastic member 16, and consequently stabilization of damping characteristics of the dynamic damper D to be achieved.

Furthermore, since the opposite end parts of the sheet-shaped elastic member 16 oppose each other on a face of the polyhedron weight 15, it is possible to reliably cover the ridge part of the polyhedron weight 15 with the sheet-shaped elastic member 16, thereby enabling further stabilization of the damping characteristics of the dynamic damper D to be achieved.

Moreover, since the ridge part of the weight 15, which is in contact with the sheet-shaped elastic member 16, is rounded it is possible to prevent the ridge part of the weight 15 from damaging the sheet-shaped elastic member 16, thus enhancing the durability of the sheet-shaped elastic member 16.

Furthermore, since the opposite end parts of the sheet-shaped elastic member 16 oppose each other on the rear face 15$r$ on the side of the weight 15 that is opposite to a seated person, even if an abnormal noise is generated by friction between opposite end parts of the sheet-shaped elastic member 16 when the weight 15 vibrates, the abnormal noise will not easily reach the seated person, thus enabling the seated person to experience good ride comfort.

Moreover, since each end part of the sheet-shaped elastic member 16 is adhered to the weight 15, fixing of the sheet-shaped elastic member 16 covering the weight 15 can be carried out simply merely by adhering the end parts of the sheet-shaped elastic member 16 to the weight 15, and an operation of mounting the sheet-shaped elastic member 16 can be carried out easily.

Furthermore, when the weight 15 is formed into a flat hexahedron, since the sheet-shaped elastic member 16 is formed from the rectangular central portion 16$a$ corresponding to the front face 15$f$ directed in the flat direction of the weight 15, and the four sheet pieces 16$b$ to 16$e$ protruding from the periphery of the central portion 16$a$, the central portion 16$a$ is superimposed on the front face 15$f$ of the weight, and the four sheet pieces 16$b$ to 16$e$ are each folded inwardly so that the end parts of the four sheet pieces oppose each other on the rear face 15$r$ of the weight 15 without overlapping one another, it is possible by means of the one simply shaped sheet-shaped elastic member 16 to cover the six faces of the hexahedral weight 15 without creasing the sheet-shaped elastic member 16, thus enabling the weight 15 to be elastically supported in all directions with a stable spring constant and the dynamic damper D to exhibit a good damping performance in all directions.

Furthermore, since the weight 15 and the sheet-shaped elastic member 16 covering same are housed within the damper case 17 supported on the headrest frame 12, it is possible by means of the damper case 17 to prevent foreign matter such as the cushion member 13 from entering into the area around the sheet-shaped elastic member 16, thus ensuring an appropriate damping function for the dynamic damper D.

Moreover, since the damper case 17 is formed from the first and second case halves 17A and 17B, which are joined to each other so that they can be separated, it is possible by separating them to easily house the weight 15 and the sheet-shaped elastic member 16 in the damper case 17 and take them out from the damper case 17. The first and second elastic support parts 24A and 24B, which engage with the front vertical frame members 12$c$ and 12$c$ of the headrest frame 12 from the direction opposite to the position of the second case half 17B, that is, from the front, are formed on the second case half 17B, and the positioning support part 30, which abuts against the front horizontal frame member 12$d$ from the direction opposite to the position of the first case half 17A, that is, from the rear, is formed on the first case half 17A; when the weight 15 vibrates vigorously in the fore-and-aft direction and a rearward vibrational impact force acts on the second case half 17B, the vibrational impact force is supported by the left and right front vertical frame members 12$c$ and 12$c$ via the first and second elastic support parts 24A and 24B extending from the second case half 17B. When a forward vibrational impact force acts on the first case half 17A, the vibrational impact force is supported by the front horizontal frame member 12$d$ via the positioning support part 30 extending from the first case half 17A. Therefore, neither forward nor rearward vibrational impact forces act on the first and second case halves 17A and 17B in the direction that separates them, and it is thus possible to prevent the damper case 17 from coming apart due to the vibrational impact force of the weight 15. Furthermore, since transmission of vibration of the weight 15 to the cushion member 13 is suppressed by the damper case 17, a disagreeable sensation is not given to an occupant.

Furthermore, since the first and second elastic support parts 24A and 24B are disposed so as to sandwich the center of gravity G of the weight 15, the vibrational impact force of the weight 15 can be supported stably via the second case half 17B.

Moreover, since the weight 15 is formed such that the center of gravity G is positioned above the center C of the weight 15, the center of gravity G of the weight 22 occupies a position as far as possible from the support point of the vibration system formed from the seat cushion 2 and the headrest 4, and it is therefore possible to contribute to the damping function of the dynamic damper D with the weight 22 having a relatively small mass.

Furthermore, since the damper case 17 has a box shape that is flat in the fore-and-aft direction so as to match the external shape of the weight 15, the front wall 17$f$ is formed as flat face or a curved face that is close thereto so as to match the front face 15$f$ of the weight 15, and the rear wall 17$r$ is formed as a curved face that is curved to a greater extent than the front wall 17$f$ with the protruding side facing toward the rear so as to match the rear face 15$r$ of the weight 15, even when the head of an occupant is strongly pressed against the front wall 17$f$ of the damper case 17 via the cushion member 13, the head of the occupant is supported over a relatively wide area of the front wall 17$f$ of the damper case 17, thereby giving no disagreeable sensation to the occupant. On the other hand, the rear face of the weight 15 and the rear wall 17$r$ of the damper case 17, which are strongly curved, can contribute to an improvement in the damping function of the dynamic damper D by utilizing effectively the space within the headrest 4 and allowing the thickness of the weight 15 to increase.

Figure 9:
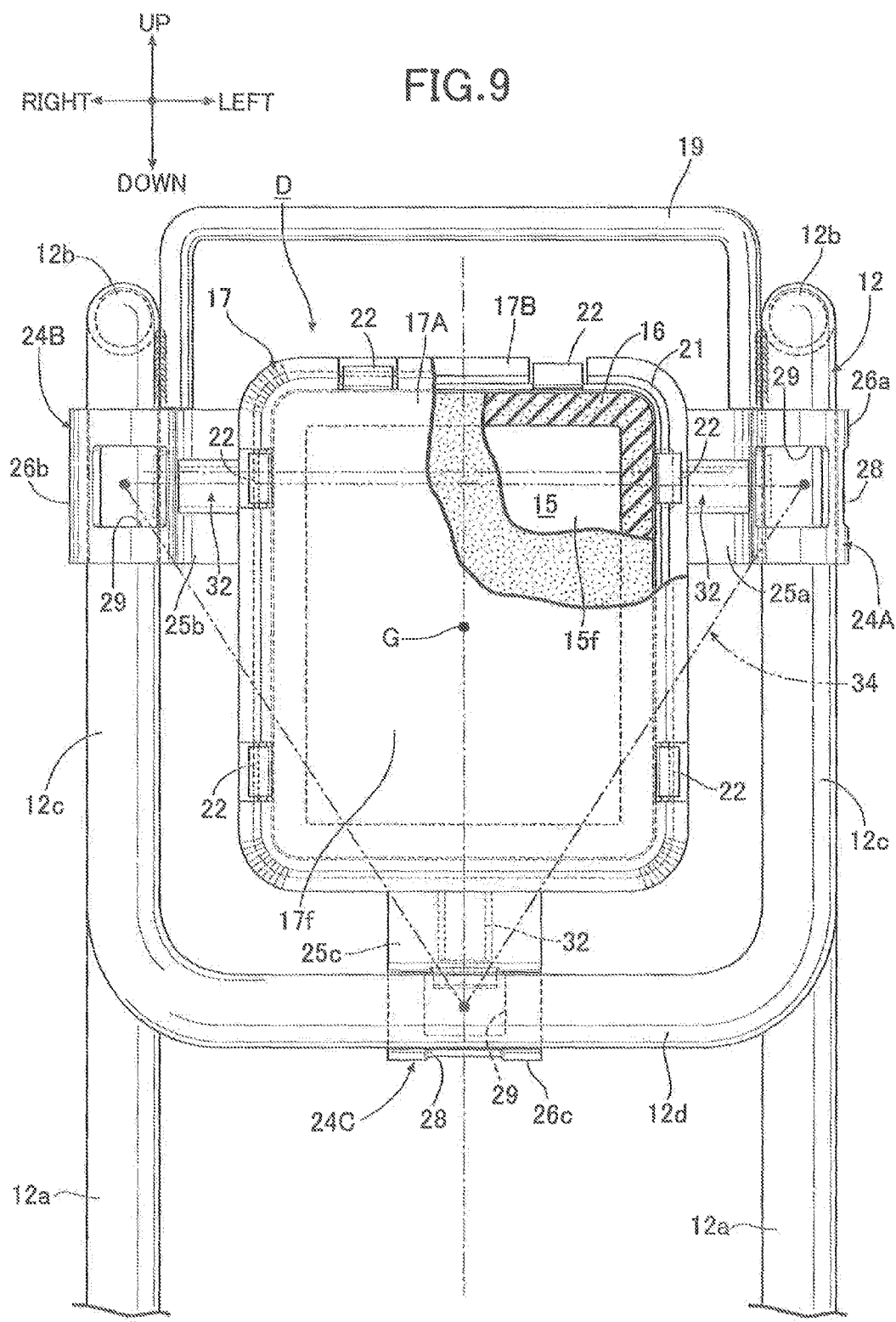
FIG. 9 is a front view, corresponding to FIG. 3, showing a second embodiment of the present invention (second embodiment).

A second embodiment of the present invention shown in FIG. 9 is now explained.

Second Embodiment

In the second embodiment, three or more elastic support parts 24A to 24C supported on a headrest frame 12 are formed on a damper case 17 so as to be positioned at apexes of a polygon 34 surrounding the center of gravity G of a weight 15; specifically, the first to third elastic support parts 24A to 24C are formed on the damper case 17 so as to be disposed at the three apexes of an inverted triangle 34, and the weight 15 is formed so that the center of gravity G of the weight 15 is positioned in a region of the inverted triangle 34. The third elastic support part 24C is formed from an arm 25c and a major arc-shaped gripping claw 26c in basically the same manner as for the first and second elastic support parts 24A and 24B.

The first and second elastic support parts 24A and 24B are formed on a second case half 17B in the same manner as in the preceding embodiment and are snap fitted onto left and right front vertical frame members 12c and 12c of the headrest frame 12 from the front, and the third elastic support member 24C is formed on a first case half 17A and snap fitted onto the front horizontal frame member 12d from the rear.

Since the arrangement is otherwise the same as that of the preceding embodiment, parts in FIG. 9 corresponding to those of the preceding embodiment are denoted by the same reference numerals and symbols, and duplication of the explanation is omitted.

In accordance with the second embodiment, since the three or more elastic support parts 24A to 24C supported on the headrest frame 12 are formed on the damper case 17 so as to be positioned at the apexes of the polygon 34 surrounding the center of gravity G of the weight 15, the vibrational impact force of the weight 15 is dispersed substantially equally to all of the elastic support parts 24A to 24C via the damper case 17, thereby suppressing vibration of the damper case 17 effectively and contributing to an improvement in the ride comfort.

Figure 10:
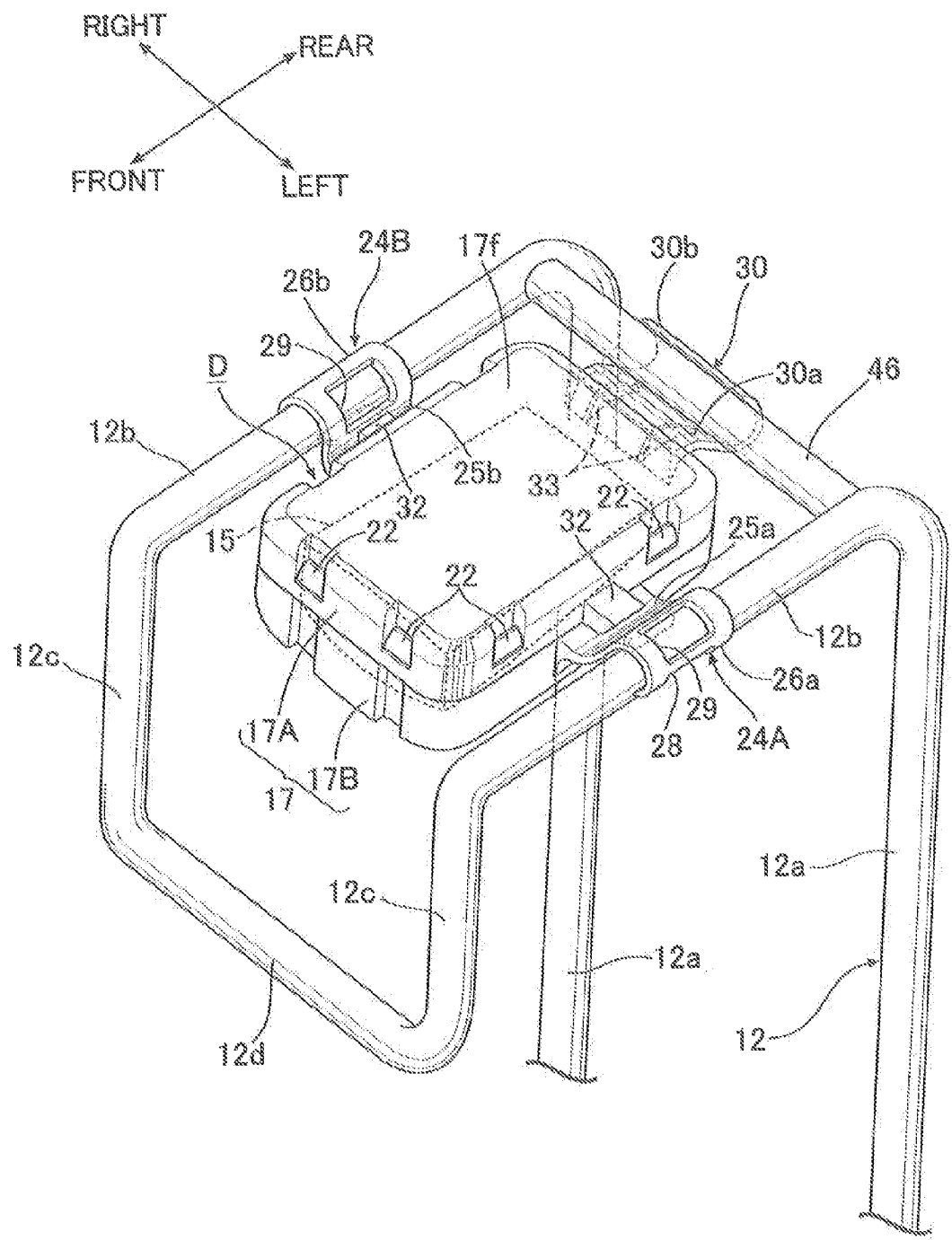
FIG. 10 is a perspective view of a headrest showing a third embodiment of the present invention (third embodiment).

A third embodiment of the present invention shown in FIG. 10 is now explained.
Third Embodiment In the third embodiment, the dynamic damper D of the first embodiment is mounted on left and right upper frame members 12b and 12b of a headrest frame 12. That is, first and second elastic support parts 24A and 24B of a damper case 17 are snap fitted onto the left and right upper frame members 12b and 12b from above, and a positioning support part 30 abuts against from below and engages with a cross member 46 linking rear end parts of the left and right upper frame members 12b and 12b. Since the arrangement is otherwise the same as that of the first embodiment, parts in FIG. 11 corresponding to those of the first embodiment are denoted by the same reference numerals and symbols, and duplication of the explanation is omitted.

In accordance with the third embodiment, it is possible, by utilizing effectively the space between the left and right upper frame members 12b and 12b for installing the dynamic damper D, to ensure that there is a sufficient thickness for a front part, against which the head of an occupant abuts, in a cushion member 13 of a headrest 4, and it is possible to enhance the damping function of the dynamic damper D by obtaining sufficient distance from the support point of a vibration system formed from a seat cushion 2 and the headrest 4 to the center of gravity G of a weight 22.

Figure 11:
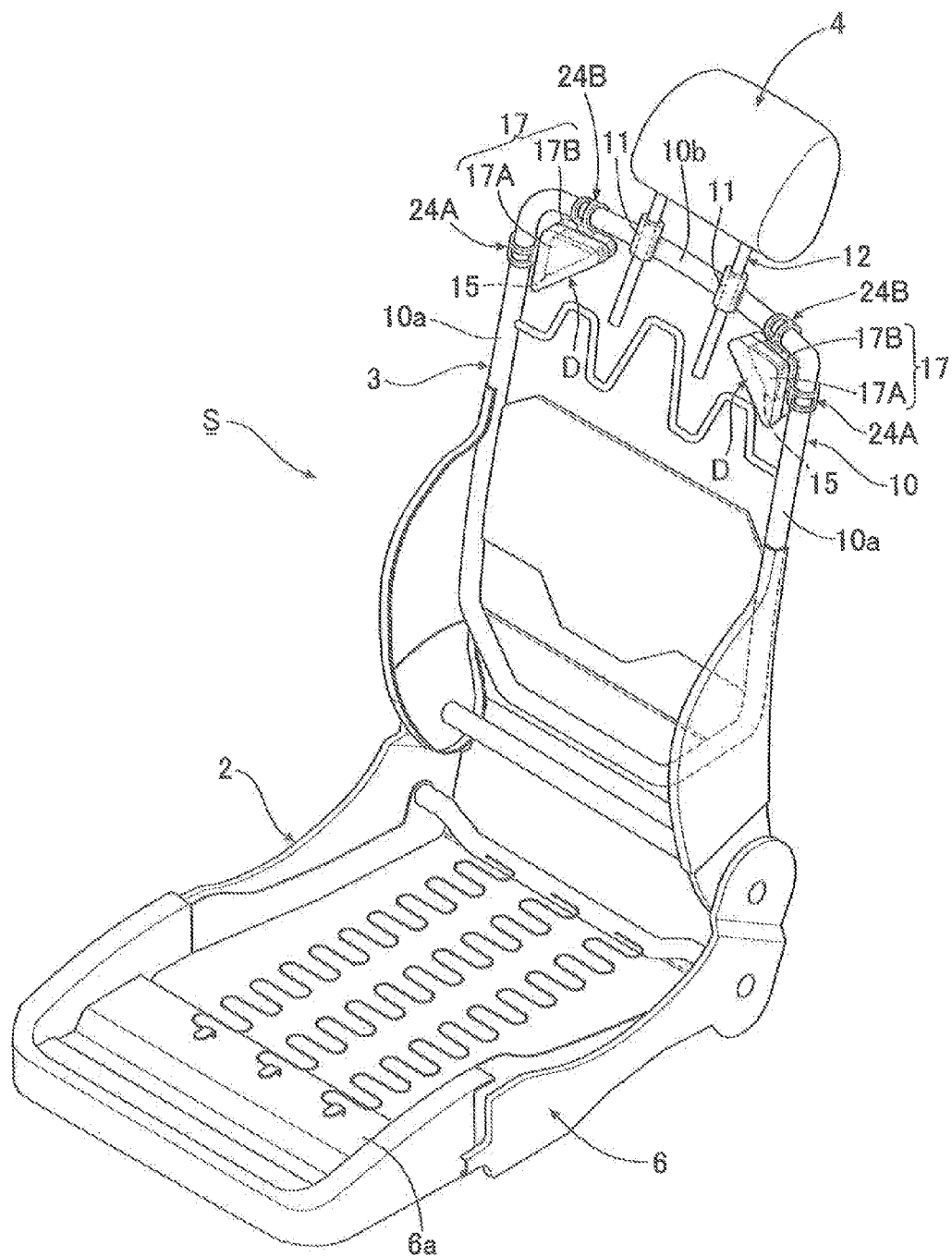
FIG. 11 is a perspective view of a seat device for an automobile showing a fourth embodiment of the present invention (fourth embodiment).

A fourth embodiment of the present invention shown in FIG. 11 is now explained.
Fourth Embodiment In the fourth embodiment, a dynamic damper D that includes a damper case 17 having a substantially right-angled triangle shape when viewed from the front is disposed on inner angles of upper left and right corners of a seat back frame 10 of a seat back 3, and a pair of elastic support parts 24A and 24B formed on an upper face and one side face of the damper case 17 are snap fitted onto a vertical frame member 10a and a lateral frame member 10b of the seat back frame 10. With regard to the structure of the dynamic damper D, only the shapes of the damper case 17 and the weight 15 housed therein are different from those of the first embodiment, and it is otherwise basically the same.

In accordance with the fourth embodiment, due to the action of the dynamic damper D disposed on the uppermost part of the seat back frame 10, damping of the seat back 3 can be carried out effectively. Moreover, dead spaces of the inner angles of the upper corners of the seat back frame 10 can be utilized effectively for installation of the dynamic damper D. The dynamic damper D may be disposed in an inner angle of only one of upper left and right corners of the seat back frame 10.

Figure 12:
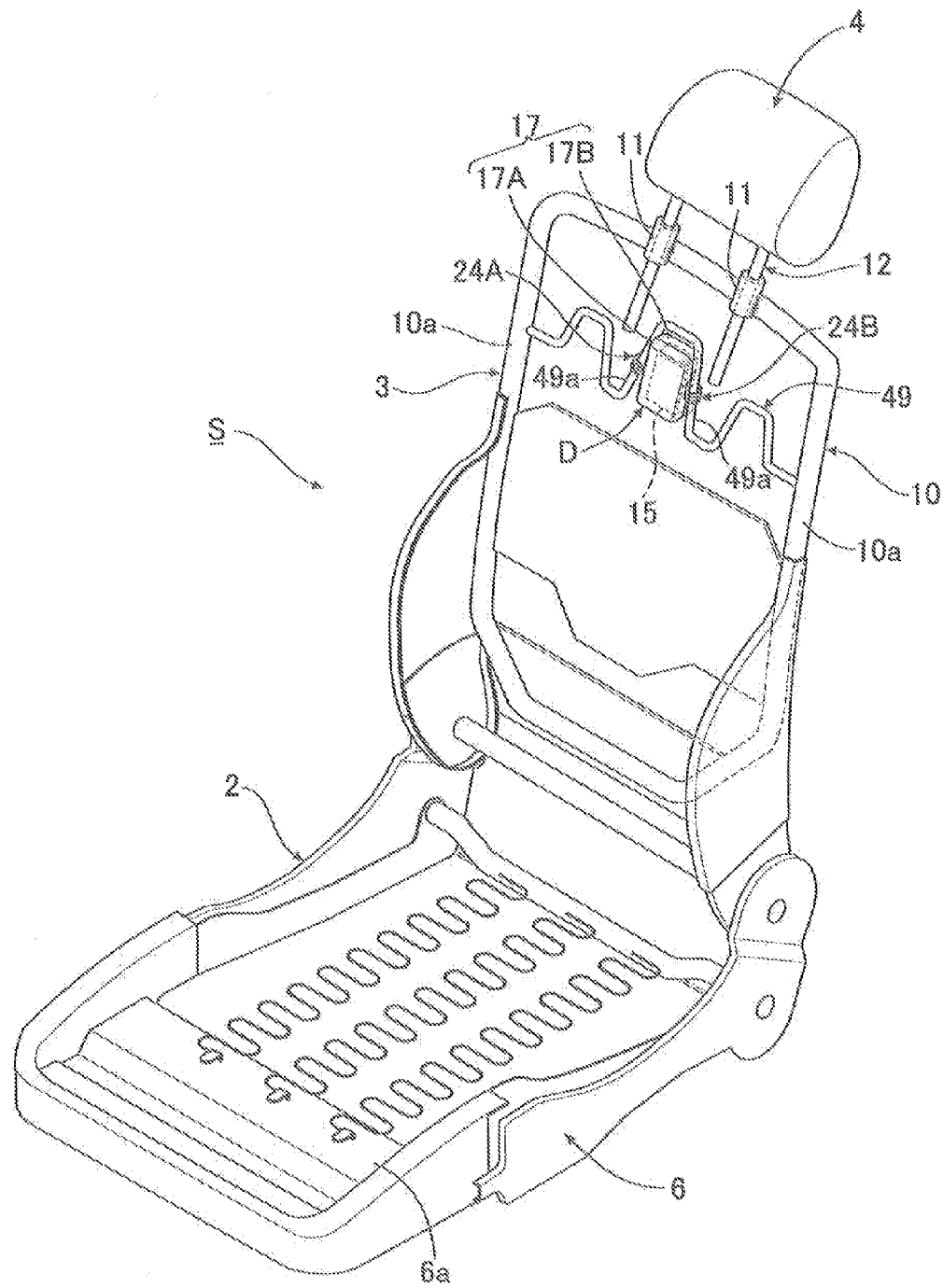
FIG. 12 is a perspective view of a seat device for an automobile showing a fifth embodiment of the present invention (fifth embodiment).

A fifth embodiment of the present invention shown in FIG. 12 is now explained.
Fifth Embodiment In the fifth embodiment, a pair of elastic support parts 24A and 24B formed on left and right side faces of a damper case 17 are snap fitted onto a pair of inclined frame portions 49a and 49a inclined in opposite directions from each other in a middle part of a wave-shaped frame member 49 integrally linking upper parts of left and right vertical frame members 10a and 10a of a seat back frame 10. In this arrangement, the pair of elastic support parts 24A and 24B are disposed in an inclined manner so as to match the pair of inclined frame portions 49a and 49a, and this prevents the pair of elastic support parts 24A and 24B from moving vertically along the pair of inclined frame portions 49a and 49a. The basic structure of the dynamic damper D is the same as that of the first embodiment. In this way, due to the operation of the single dynamic damper D mounted on the upper part and the central part of the seat back frame 10, damping of a seat back 3 can be carried out effectively.

Figure 13:
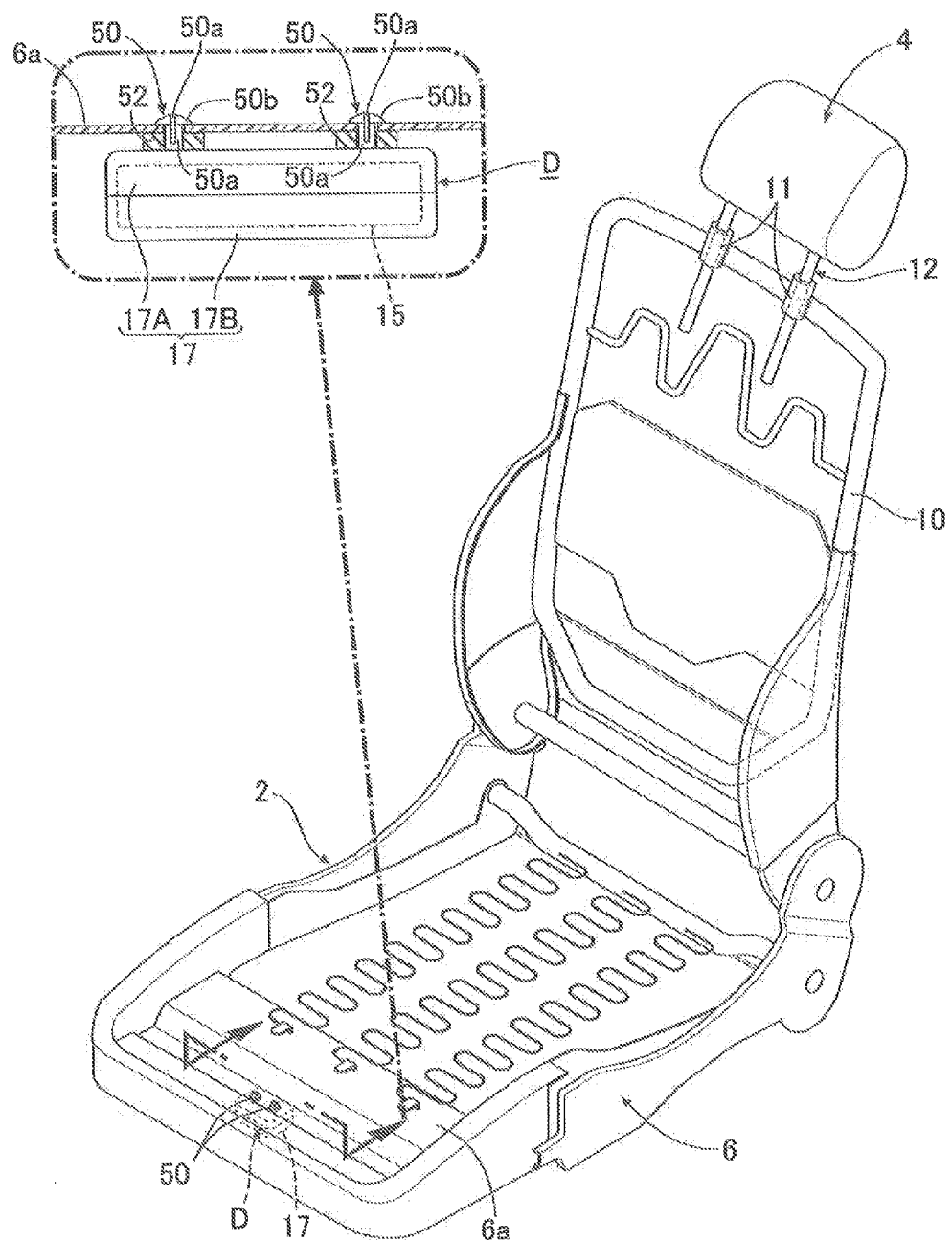
FIG. 13 is a perspective view of a seat device for an automobile showing a sixth embodiment of the present invention (sixth embodiment).

A sixth embodiment of the present invention shown in FIG. 13 is now explained.
Sixth Embodiment In the sixth embodiment, in order to damp a seat cushion 2, a damper case 17 of a dynamic damper D is mounted on a front reinforcing plate 6a welded to a front part of a seat cushion frame 6 and extending in the left-and-right direction. In this case, formed on an upper face of the damper case 17 are a pair of elastic support parts 50 and 50. Each elastic support part 50 is formed from a shaft portion 50a projecting from an outside face of the damper case 17 and an arrow-shaped latching projection 50b formed at the extremity of the shaft portion 50a, and in order to elastically reduce the diameter of the latching projection 50b, a slit 50c is provided from the extremity of the latching projection 50b to the shaft portion 50a. Furthermore, an elastic collar 52 made of rubber is fitted onto the shaft portion 50a. On the other hand, a pair of latching holes 51 and 51 are bored in the front reinforcing plate 6a so as to correspond to the pair of elastic support parts 50 and 50, the latching projection 50b of the elastic support parts 50 and 50 are pushed into the latching holes 51 and 51 from below, each latching projection 50b does not reduce in diameter elastically but passes through the latching hole 51, and then increases in diameter to its original shape, that is, it is snap fitted, thereby preventing it from disengaging from the latching hole 51. In this arrangement, the elastic collar 52 fitted around the shaft portion 50a is compressed between the front reinforcing plate 6a and the damper case 17, and the reaction force thereof allows the latching projection 50b to be retained on the front face of the front reinforcing plate 6a without rattling. Other than the above elastic support parts 50 and 50, the structures of the damper case 17, a weight 15 housed therein, and a sheet-shaped elastic member 16 covering same are basically the same as those of the first embodiment. Therefore, parts in FIG. 13 corresponding to those of the first embodiment are denoted by the same reference numerals and symbols, and duplication of the explanation is omitted.

In accordance with the sixth embodiment, due to the operation of the dynamic damper D disposed on the front end part of the seat cushion frame 6, damping of the seat cushion 2 can be carried out effectively. Moreover, the dead space beneath the front reinforcing plate 6a at the front end of the seat cushion frame 6 can be utilized effectively for installation of the dynamic damper D and, furthermore, by a simple pushing-in operation the elastic support parts 50 and 50 can be snap fitted into the latching holes 51 and 51 of the front reinforcing plate 6a, thus enabling mounting of the damper case 17 to be easily carried out.

Figure 14:
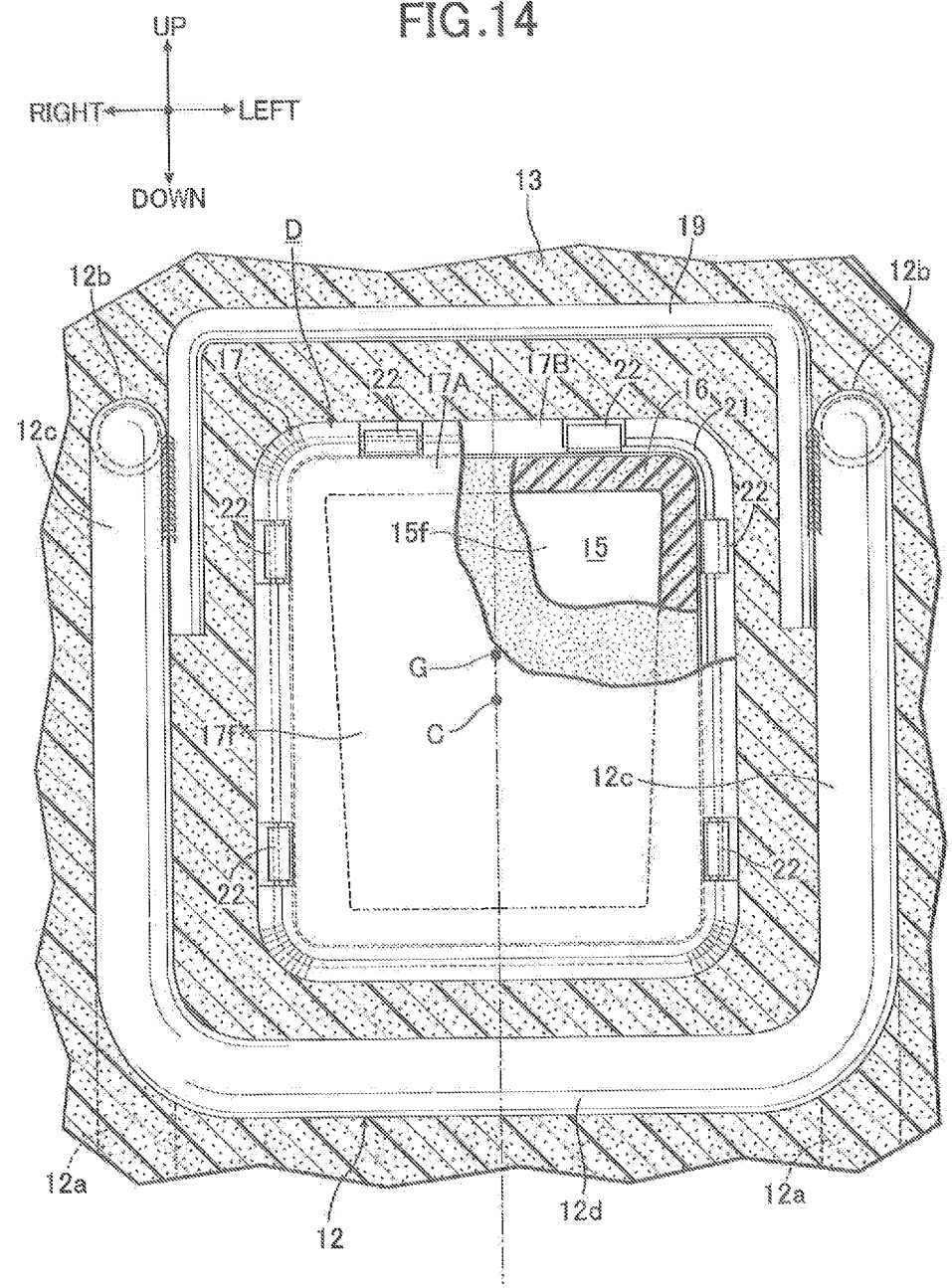
FIG. 14 is a view, corresponding to FIG. 3, showing a seventh embodiment of the present invention (seventh embodiment).

A seventh embodiment of the present invention shown in FIG. 14 is now explained.

Seventh Embodiment

In the seventh embodiment, a damper case 17 is not provided with an elastic support part, and instead the damper case 17 is embedded and held in a cushion member 13, which is harder than the sheet-shaped elastic member 16; since the arrangement is otherwise the same as that of the first embodiment, parts in FIG. 14 corresponding to those of the first embodiment are denoted by the same reference numerals and symbols, and duplication of the explanation is omitted.

In accordance with the seventh embodiment, due to the damper case 17 being provided with no elastic support part, the structure of the dynamic damper D can be simplified accordingly. When the damper case 17 is embedded in the foam material cushion member 13, the damper case 17 is suspended from the headrest frame 12 using a thread and held at a predetermined position, and after the cushion member 13 is molded, the thread is cut.

Figure 15:
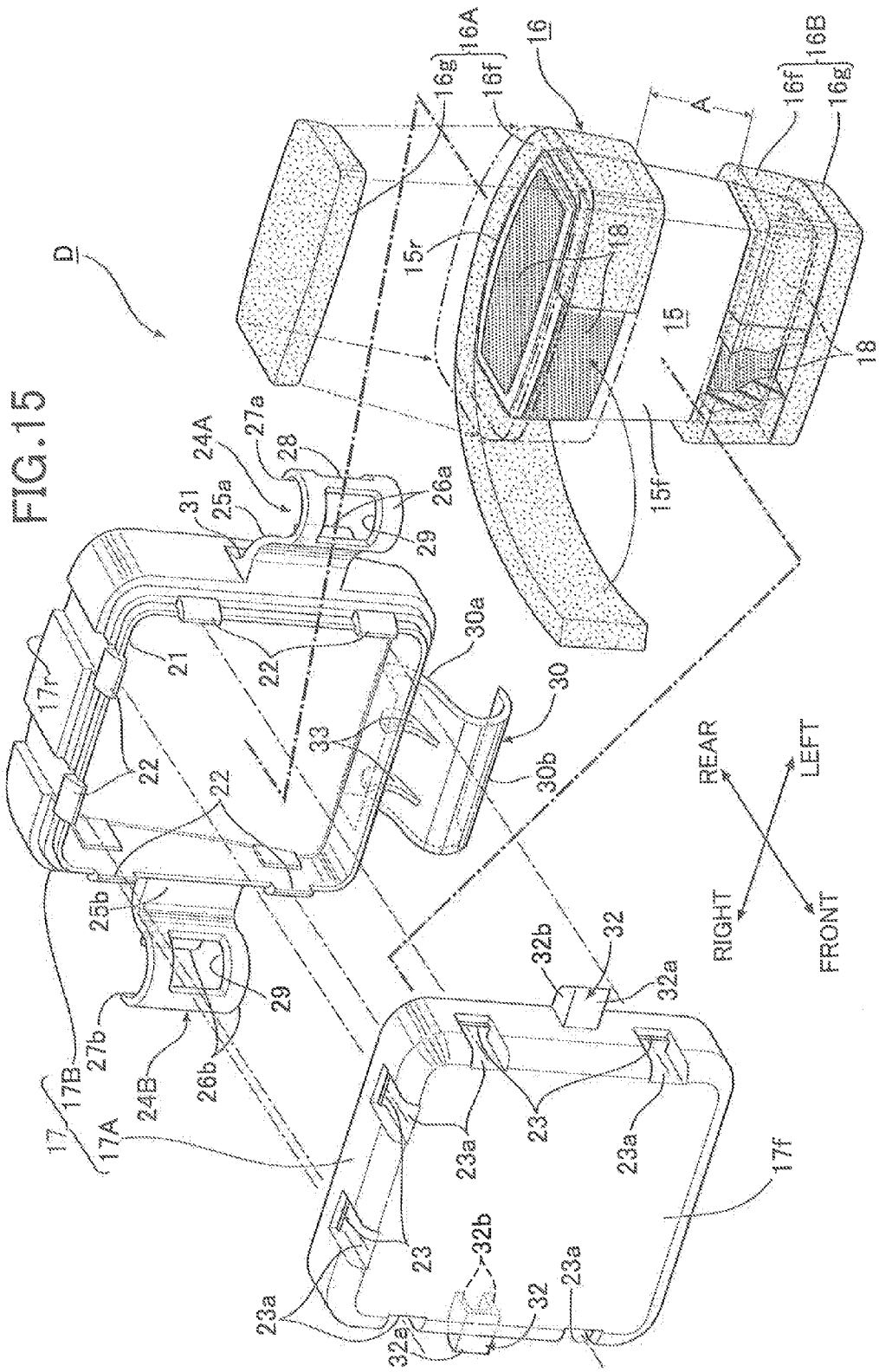
FIG. 15 is a view, corresponding to FIG. 7, showing an eighth embodiment of the present invention (eighth embodiment).

An eighth embodiment of the present invention shown in FIG. 15 is now explained.

Eighth Embodiment

In the eighth embodiment, a sheet-shaped elastic member 16 is formed from a first elastic portion 16A covering an upper end part of a weight 15 and a second elastic portion 16B covering a lower end part of the weight 15. The first and second elastic portions 16A and 16B have the same structure and shape and are formed from elastic band pieces 16f and 16f adhered to an outer face of the weight 15 via an adhesive 18 so as to surround an upper end part and a lower end part of the weight 15, and elastic end plates 16g and 16g adhered to an upper end face and a lower end face of the weight 15 and an upper end face and a lower end of the band pieces 16f and 16f via an adhesive 18, and the peripheral edge at the upper end and the peripheral edge at the lower end of the weight 15 are therefore covered by the sheet-shaped elastic member 16. A non-covering region A that does not cover the weight 15 is provided between the first and second elastic portions 16A and 16B.

Whereas the first and second elastic portions 16A and 16B have the same structure and shape, the shapes of the upper end part and the lower end part of the weight 15 are slightly different from each other, but by imparting slight differences in expansion and contraction to the first and second elastic portions 16A and 16B, first and second elastic portions 16A and 16B having the same structure and shape can be adhered without problems to the upper end part and the lower end part of the weight 15.

The sheet-shaped elastic member 16 is disposed in a compressed state between an outer face of the weight 15 and an inner face of the damper chamber C opposing the outer face. This enables the weight 15 to be always held at a predetermined position while preventing the sheet-shaped elastic member 16 from being displaced within the damper chamber C, thus suppressing unnecessary movement of the weight 15 and ensuring a predetermined damping function.

Since the arrangement is otherwise substantially the same as that of the first embodiment, parts in FIG. 15 corresponding to those of the first embodiment are denoted by the same reference numerals and symbols, and duplication of the explanation is omitted.

In accordance with the eighth embodiment, since the non-covering region A that does not cover the weight 15 is provided between the first and second elastic portions 16A and 16B forming the sheet-shaped elastic member 16, it is possible, by increasing or decreasing the vertical gap of the non-covering region A, and specifically increasing or decreasing the vertical width of the elastic band piece 16f, to easily adjust the spring constant of the sheet-shaped elastic member 16, thus enabling adjustment and alteration of damping characteristics of the dynamic damper D to be easily carried out at a low cost.

Furthermore, since the peripheral edge at the upper end and the peripheral edge at the lower end of the polygonal weight 15 are covered by the sheet-shaped elastic member 16, it is possible to avoid effectively contact of the weight 15 with the inner face of the damper chamber 17C with the minimum necessary amount of damping of the sheet-shaped elastic member 16, thereby enabling the occurrence of an abnormal noise due to the contact to be reliably prevented.

Moreover, since the sheet-shaped elastic member 16 is disposed as a layer along the outer face of the weight 15, the space occupied by the sheet-shaped elastic member 16 in the damper chamber 17C can be made sufficiently narrow, thus enabling the damper case 17 to be made compact.

Furthermore, since the first and second elastic portions 16A and 16B are formed so as to have the same shape so that they are interchangeable with each other, either of the first and second elastic portions 16A and 16B may be assembled on either of the upper end part and the lower end part of the weight 15, thereby enabling erroneous assembly to be prevented.

Figure 16:
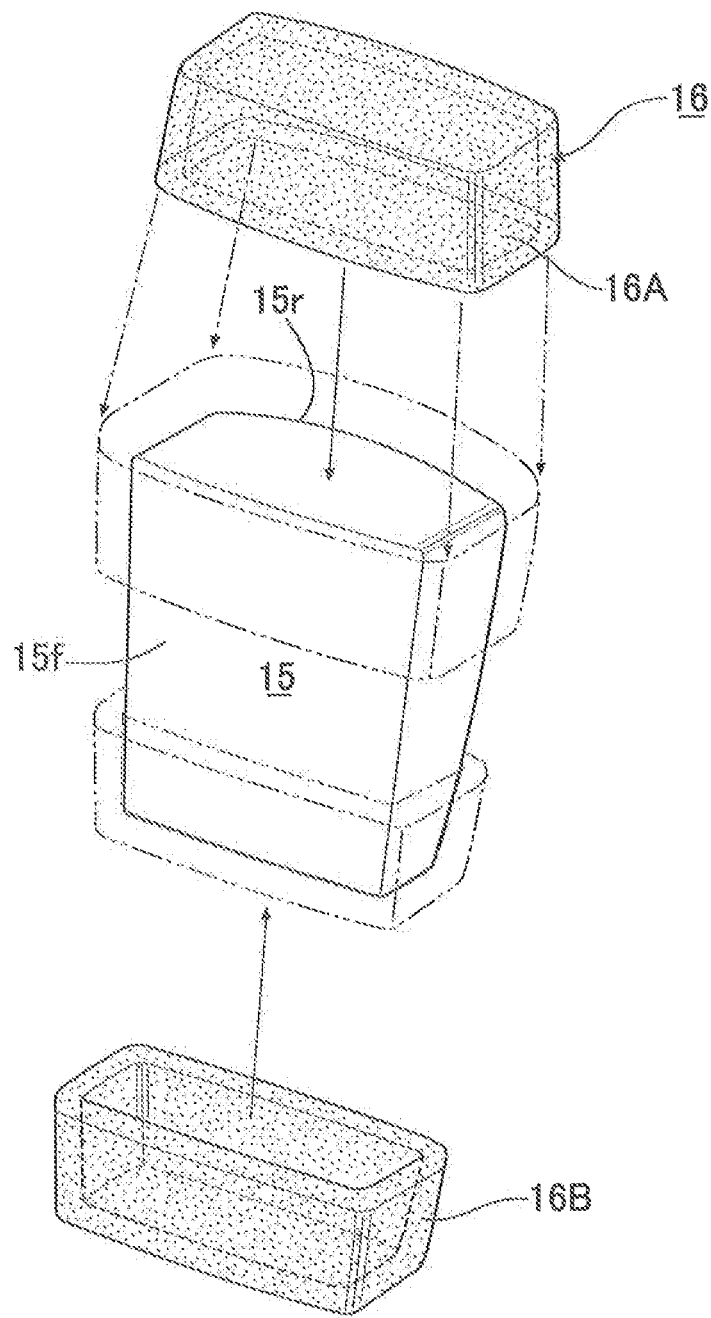
FIG. 16 is a view, corresponding to FIG. 15, showing a ninth embodiment of the present invention (ninth embodiment).

A ninth embodiment of the present invention shown in FIG. 16 is now explained.

Ninth Embodiment

In the ninth embodiment, first and second elastic portions 16A and 16B forming a sheet-shaped elastic member 16 are formed into cap shapes fitted onto an upper end part and a lower end part of a weight 15. Since the arrangement is otherwise the same as that of the first embodiment, parts in FIG. 16 corresponding to those of the first embodiment are denoted by the same reference numerals and symbols, and duplication of the explanation is omitted.

In accordance with the ninth embodiment, the cap-shaped first and second elastic portions 16A and 16B are simply fitted onto the upper end part and the lower end part of the weight 15 and can be mounted on the weight 15 without adhesion and, moreover, housing the first and second elastic portions 16A and 16B together with the weight 15 in a damper chamber 17C enables the same effects as those of the first embodiment, where adhesion is carried out, to be obtained.

Figure 17:
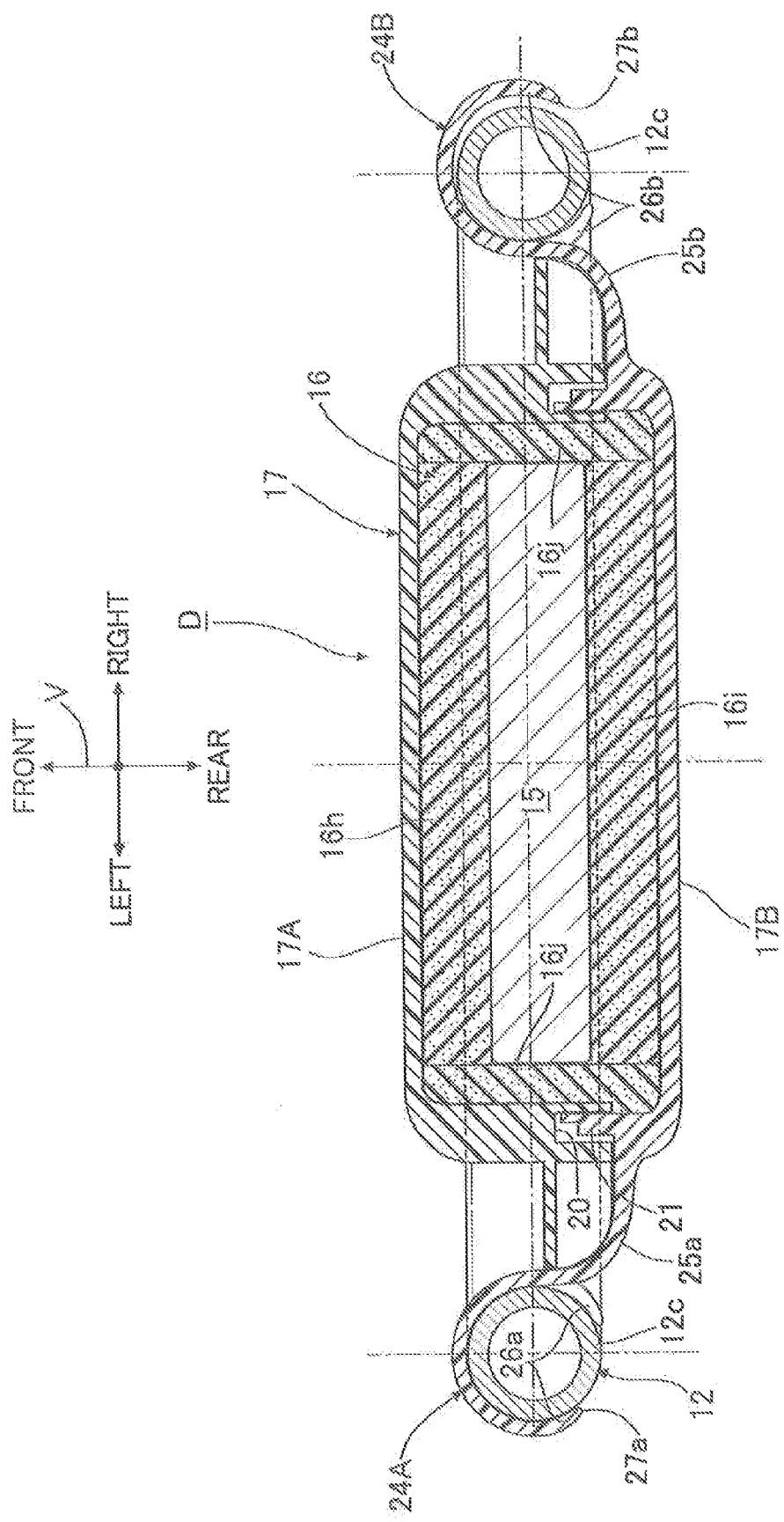
FIG. 17 is a view, corresponding to FIG. 5, showing a tenth embodiment of the present invention (tenth embodiment).
Figure 18:
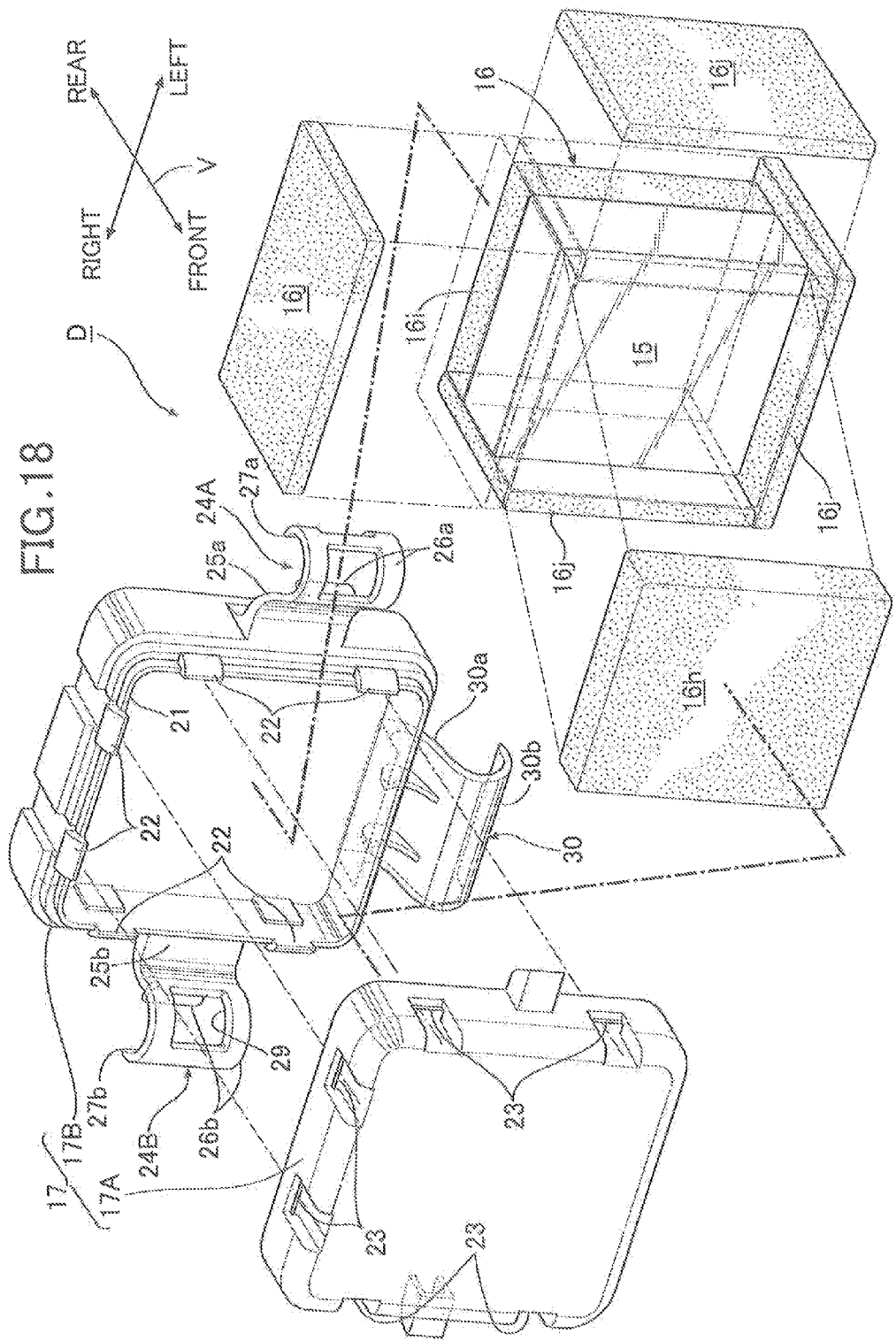
FIG. 18 is an exploded perspective view of a dynamic damper in FIG. 17 (tenth embodiment).

A tenth embodiment of the present invention shown in FIG. 17 and FIG. 18 is now explained.

Tenth Embodiment

In the tenth embodiment, a sheet-shaped elastic member 16 in a dynamic damper D is formed from six urethane foam elastic sheets 16h, 16i, 16j adhered to six faces of a weight 15; in particular, the elastic sheets 16h and 16i covering a front face and a rear face of the weight 15 have a larger thickness than that of the other elastic sheets 16*j*. In this case, all of the elastic sheets 16*h*, 16*i*, 16*j* are formed from the same material or the elastic sheets 16*h* and 16*i* of a front part and a rear part are formed from a material that is more flexible than the other elastic sheets 16*j*.

Since the arrangement is otherwise the same as that of the first embodiment except for the shapes of the weight 15 and the damper case 17, parts in FIG. 17 and FIG. 18 corresponding to the first embodiment are denoted by the same reference numerals and symbols, and duplication of the explanation is omitted.

While an automobile is traveling, when there is transmission from a floor F of the automobile to a front seat S, in the front seat S a seat back 3 system that includes a headrest 4 is usually made to vibrate in a fore-and-aft direction V. In the dynamic damper D, which is fitted in the headrest 4, with regard to the six elastic sheets 16*h*, 16*i*, 16*j* forming the sheet-shaped elastic member 16, since the elastic sheets 16*h* and 16*i* covering the front face and the rear face of the weight 15 have a larger thickness than that of the other elastic sheets 16*j*, and all of the elastic sheets 16*h*, 16*i*, 16*j* are formed from the same material or the elastic sheets 16*h* and 16*i* of the front part and the rear part are formed from a more flexible material than that of the other elastic sheets 16*j*, it is easier for the elastic sheets 16*h* and 16*i* covering the front face and the rear face of the weight 15 to undergo compressive deformation than for the other elastic sheets 16*j*. Therefore, resonance of the weight 15 in response to the fore-and-aft vibration of the seat back 3 system is accompanied by compressive deformation of the elastic sheets 16*h* and 16*i* in front and to the rear thereof, and the vibrational energy of the seat back 3 system is instead absorbed, thereby damping the seat back 3 system, that is, the seat back 3 and the headrest 4.

In this process, since transmission of vibration of the weight 15 to the cushion member 13 is suppressed by means of the damper case 17, a disagreeable sensation is not given to an occupant.

Furthermore, since the elastic sheets 16*j* covering the outer faces, except for the front face and the rear face of the weight 15, have a smaller thickness than that of the elastic sheets 16*h* and 16*i* covering the front face and the rear face of the weight 15, the damper case 17, and consequently the dynamic damper D, can be made compact, and the damping of the dynamic damper D has a directionality in the fore-and-aft direction V with respect to the seat back 3 system.

Moreover, since the weight 15 having the front face and the rear face covered by the thick elastic sheets 16*h* and 16*i* is formed so as to be flat in the direction of vibration of the seat back 3 system so as to widen in a direction perpendicular to the direction of fore-and-aft vibration of the seat back 3 system, the flat weight 15 is equivalent to a large number of weights arranged over a wide range and resonating in the direction of the fore-and-aft vibration of the seat back 3 system, and therefore the flat weight 15 resonates in the direction of fore-and-aft vibration of the seat back 3 system over a wide range, thereby enabling damping thereof to be carried out more effectively.

An eleventh embodiment of the present invention shown in FIG. 19 is now explained.

Eleventh Embodiment

In the eleventh embodiment, as shown in FIG. 19 (A), as a sheet-shaped elastic member 16, elastic sheets 16*h*, 16*i*, and 16*j* formed from the same material with the same thickness are adhered to all faces of a weight 15 before being housed in damper case 17, but as shown in FIG. 19 (B), when the weight 15 covered with the elastic sheets 16*h*, 16*i*, and 16*j* as described above is housed in the damper case 17, the amount of compression set of the elastic sheets 16*h* and 16*i* covering the front face and the rear face of the weight 15 is controlled so that it is smaller than the amount of compression set of the other elastic sheets 16*j*. As a result, within the damper case 17, the thickness of the elastic sheets 16*h* and 16*i* covering the front face and the rear face of the weight 15 is larger than the thickness of the other elastic sheets 16*j*. The damper case 17 is fitted within a headrest 4 as in the preceding embodiments. Since the arrangement is otherwise the same as that of the tenth embodiment, parts in FIG. 19 corresponding to those of the tenth embodiment are denoted by the same reference numerals and symbols, and duplication of explanation is thus omitted.

In accordance with the eleventh embodiment, since the amount of compression set of the elastic sheets 16*h* and 16*i* covering the front face and the rear face of the weight 15 is smaller than that of the other elastic sheets 16*j*, as in the tenth embodiment, it is easier for the elastic sheets 16*h* and 16*i* covering the front face and the rear face of the weight 15 to undergo compressive deformation than for the other elastic sheets 16*j*, and as a result the weight 15 can resonate in response to the fore-and-aft vibration of the seat back 3 system, thereby damping the seat back 3 system. Furthermore, in the eleventh embodiment also, the elastic sheets 16*j* covering the outer faces, except for the front face and the rear face of the weight 15, have a smaller thickness than that of the elastic sheets 16*h* and 16*i* covering the front face and the rear face of the weight 15, and the damper case 17, and consequently the dynamic damper D, can be made compact accordingly.

The present invention is not limited to the above embodiments and may be modified in a variety of ways as long as the modifications do not depart from the spirit and scope thereof. For example, the first to third embodiments can be applied in combination with the fourth and the fifth embodiment. Furthermore, one of the first and second halves 17A and 17B forming the damper case 17 may be formed into a box shape having an opening and the other may be formed into a lid shape closing the opening. Moreover, the seat device of the present invention may be applied not only to an automobile but also to a railway vehicle, an airplane, etc. Furthermore, the seat S may be installed so as to protrude from a wall face of a vehicle.

The invention claimed is:

1. A seat device for a vehicle, said seat device comprising a dynamic damper which comprises:
   a weight; and
   a sheet-shaped elastic member supporting the weight such that the weight is capable of vibrating relative to a frame or a cushion member of a seat installed in the vehicle, the elastic member being retained on the frame or the cushion member,
   wherein the weight is formed in a shape of a polyhedron, and the weight is covered by the sheet-shaped elastic member and supported on the frame or the cushion member of the seat, and
   wherein the sheet-shaped elastic member is formed so as to be wrapped around the weight and opposite end parts of the sheet-shaped elastic member oppose each other without being superimposed on one another.

2. The seat device for a vehicle according to claim 1, wherein the opposite end parts of the sheet-shaped elastic member are adhered to the weight.

3. The seat device for a vehicle according to claim 1, wherein the weight and the sheet-shaped elastic member covering the weight are housed within a damper case supported on the frame or the cushion member of the seat.

4. The seat device for a vehicle according to claim 3, wherein the weight and the sheet-shaped elastic member covering the weight are housed within the damper case supported on the cushion member of the seat, and the sheet-shaped elastic member is formed from a material that is softer than the cushion member.

5. The seat device for a vehicle according to claim 1, wherein the weight is formed into a hexahedron whereas the sheet-shaped elastic member is formed from a rectangular central portion corresponding to a first face of the weight and four sheet pieces protruding from a periphery of the central portion, the central portion is superimposed on the first face of the weight, and the four sheet pieces are each folded inwardly so that end parts of the four sheet pieces oppose each other on a second face on a side opposite to the first face of the weight.

6. The seat device for a vehicle according to claim 1, wherein the opposite end parts of the sheet-shaped elastic member oppose each other on a face of the weight.

7. The seat device for a vehicle according to claim 6, wherein a ridge part of the weight, that is in contact with the sheet-shaped elastic member, is rounded.

8. The seat device for a vehicle according to claim 7, wherein the opposite end parts of the sheet-shaped elastic member are adhered to the weight.

9. The seat device for a vehicle according to claim 7, wherein the weight and the sheet-shaped elastic member covering the weight are housed within a damper case supported on the frame or the cushion member of the seat.

10. The seat device for a vehicle according to claim 9, wherein the weight and the sheet-shaped elastic member covering the weight are housed within the damper case supported on the cushion member of the seat, and the sheet-shaped elastic member is formed from a material that is softer than the cushion member.

11. The seat device for a vehicle according to claim 7, wherein the weight is formed into a hexahedron whereas the sheet-shaped elastic member is formed from a rectangular central portion corresponding to a first face of the weight and four sheet pieces protruding from a periphery of the central portion, the central portion is superimposed on the first face of the weight, and the four sheet pieces are each folded inwardly so that end parts of the four sheet pieces oppose each other on a second face on a side opposite to the first face of the weight.

12. The seat device for a vehicle according to claim 6, wherein the opposite end parts of the sheet-shaped elastic member oppose each other on the face of the weight on a side of the seat device configured to be disposed opposite to a seated person during use.

13. The seat device for a vehicle according to claim 12, wherein the opposite end parts of the sheet-shaped elastic member are adhered to the weight.

14. The seat device for a vehicle according to claim 12, wherein the weight and the sheet-shaped elastic member covering the weight are housed within a damper case supported on the frame or the cushion member of the seat.

15. The seat device for a vehicle according to claim 14, wherein the weight and the sheet-shaped elastic member covering the weight are housed within the damper case supported on the cushion member of the seat, and the sheet-shaped elastic member is formed from a material that is softer than the cushion member.

16. The seat device for a vehicle according to claim 6, wherein the weight and the sheet-shaped elastic member covering the weight are housed within a damper case supported on the frame or the cushion member of the seat.

17. The seat device for a vehicle according to claim 16, wherein the weight and the sheet-shaped elastic member covering the weight are housed within the damper case supported on the cushion member of the seat, and the sheet-shaped elastic member is formed from a material that is softer than the cushion member.

18. A seat device for a vehicle, said seat device comprising a dynamic damper which comprises:
a weight; and
a sheet-shaped elastic member supporting the weight such that the weight is capable of vibrating relative to a frame or a cushion member of a seat installed in the vehicle, the elastic member being retained on the frame or the cushion member,
wherein:
the weight is formed in a shape of a polyhedron, and the weight is covered by the sheet-shaped elastic member and supported on the frame or the cushion member of the seat;
opposite end parts of the sheet-shaped elastic member are adhered to the weight; and
the weight and the sheet-shaped elastic member covering the weight are housed within a damper case supported on the frame or the cushion member of the seat, and the sheet-shaped elastic member is formed from a material that is softer than the cushion member.

19. A seat device for a vehicle, said seat device comprising a dynamic damper which comprises:
a weight; and
a sheet-shaped elastic member supporting the weight such that the weight is capable of vibrating relative to a frame or a cushion member of a seat installed in the vehicle, the elastic member being retained on the frame or the cushion member,
wherein the weight is formed in a shape of a polyhedron, the weight is covered by the sheet-shaped elastic member and supported on the frame or the cushion member of the seat, and in order to adjust a spring constant of the sheet-shaped elastic member, the sheet-shaped elastic member is provided with a non-covering region in which the sheet-shaped elastic member does not cover the weight.

20. The seat device for a vehicle according to claim 19, wherein the sheet-shaped elastic member is formed from a first elastic portion that covers one end part of the weight and a second elastic portion that covers the other end part of the weight, and the non-covering region is provided between the first and second elastic portions.

21. The seat device for a vehicle according to claim 20, wherein the first and second elastic portions are formed so as to have the same shape interchangeable with each other.

22. The seat device for a vehicle according to claim 20, wherein the weight is formed into a polygon, a damper chamber is formed into a similar polygon to the weight, and a peripheral edge part at one end and a peripheral edge part at the other end of the weight are covered by the sheet-shaped elastic member.

23. The seat device for a vehicle according to claim 20, wherein the sheet-shaped elastic member is disposed as a layer along an outer face of the weight.

24. The seat device for a vehicle according to claim 19, wherein the weight is formed into a polygon, a damper chamber is formed into a similar polygon to the weight, and a peripheral edge part at one end and a peripheral edge part at the other end of the weight are covered by the sheet-shaped elastic member.

25. The seat device for a vehicle according to claim 19, wherein the sheet-shaped elastic member is disposed as a layer along an outer face of the weight.

26. The seat device for a vehicle according to claim 20, wherein the first and second elastic portions are each formed in a cap shape that is fitted onto the one end part and the other end part respectively of the weight.

27. The seat device for a vehicle according to claim 26, wherein the first and second elastic portions are formed so as to have the same shape and are interchangeable with each other.

28. The seat device for a vehicle according to claim 6, wherein the opposite end parts of the sheet-shaped elastic member are adhered to the weight.

29. The seat device for a vehicle according to claim 6, wherein the weight is formed into a hexahedron whereas the sheet-shaped elastic member is formed from a rectangular central portion corresponding to a first face of the weight and four sheet pieces protruding from a periphery of the central portion, the central portion is superimposed on the first face of the weight, and the four sheet pieces are each folded inwardly so that end parts of the four sheet pieces oppose each other on a second face on a side opposite to the first face of the weight.

30. The seat device for a vehicle according to claim 12, wherein the weight is formed into a hexahedron whereas the sheet-shaped elastic member is formed from a rectangular central portion corresponding to a first face of the weight and four sheet pieces protruding from a periphery of the central portion, the central portion is superimposed on the first face of the weight, and the four sheet pieces are each folded inwardly so that end parts of the four sheet pieces oppose each other on a second face on the side opposite to the first face of the weight.

31. A seat device for a vehicle, said seat device comprising a dynamic damper which comprises:
 a weight; and
 a sheet-shaped elastic member supporting the weight such that the weight is capable of vibrating relative to a frame or a cushion member of a seat installed in the vehicle, the elastic member being retained on the frame or the cushion member,
 wherein the weight is formed in a shape of a polyhedron, and the weight is covered by the sheet-shaped elastic member and supported on the frame or the cushion member of the seat, and wherein
 the weight is formed in a shape of a hexahedron whereas the sheet-shaped elastic member comprises a rectangular central portion corresponding to a first face of the weight and four sheet pieces formed integrally with and protruding from periphery of the central portion, the central portion is superimposed on the first face of the weight, and the four sheet pieces are each folded inwardly so that end parts of the four sheet pieces oppose each other on a second face on a side opposite to the first face of the weight.

* * * * *